(12) United States Patent
Van Nest et al.

(10) Patent No.: US 11,067,470 B2
(45) Date of Patent: *Jul. 20, 2021

(54) METHODS OF LEAK TESTING A SURGICAL CONDUIT

(71) Applicant: Edwards Lifesciences Corporation, Irvine, CA (US)

(72) Inventors: Mark Van Nest, Rancho Santa Margarita, CA (US); Alyssa E. Kornswiet, Orange, CA (US); Jackie P. Lau, Anaheim, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 16/169,701

(22) Filed: Oct. 24, 2018

(65) Prior Publication Data

US 2019/0056286 A1 Feb. 21, 2019

Related U.S. Application Data

(63) Continuation of application No. 15/065,720, filed on Mar. 9, 2016, now Pat. No. 10,119,882.

(Continued)

(51) Int. Cl.
*G01M 3/28* (2006.01)
(52) U.S. Cl.
CPC ........ *G01M 3/2876* (2013.01); *G01M 3/2846* (2013.01)
(58) Field of Classification Search
CPC ............ G01M 3/02; G01M 3/26; G01M 3/28; G01M 3/2876; G01M 3/2846

(Continued)

(56) References Cited

U.S. PATENT DOCUMENTS 3,088,312 A * 5/1963 Morris ................ G01M 3/2876
73/46
3,997,923 A 12/1976 Possis
(Continued)

FOREIGN PATENT DOCUMENTS

CN 102944368 A 2/2013
CN 203908874 U 10/2014
(Continued)

OTHER PUBLICATIONS

International Search Report of PCT/US2016/021834, dated Jun. 13, 2016.
(Continued)

*Primary Examiner* — Nathaniel J Kolb
(74) *Attorney, Agent, or Firm* — Guy Cumberbatch

(57) ABSTRACT

Systems, devices, and methods for leak testing surgical conduit grafts or valved conduits such as aortic-valved conduits with a pressurized gas such as air. Air is non-destructive and especially useful for leak testing conduits that have coatings or sealants that may be functionally impacted when exposed to fluids such as water or saline. Open ends of the conduit are clamped and sealed, and a pressurized gas introduced into an inner lumen thereof. A change in mass flow rate is measured to quantify the leakage. One end of a tubular conduit may be clamped to a fixed manifold, and the opposite end to a manifold slidably mounted to accommodate any conduit elongation when pressurized. The clamping and sealing structure may be pneumatic and/or mechanical, and complementary contoured clamp members may be used to seal a scalloped external sealing ring of an aortic conduit.

18 Claims, 14 Drawing Sheets

Related U.S. Application Data

(60) Provisional application No. 62/131,134, filed on Mar. 10, 2015.

(58) Field of Classification Search
USPC .................................................. 73/37–49.8
See application file for complete search history.

(56) References Cited

U.S. PATENT DOCUMENTS

| | | | |
|---|---|---|---|
| 4,211,107 A * | 7/1980 | Sleeter | G01M 3/2846 73/49.6 |
| 4,218,782 A | 8/1980 | Rygg | |
| 4,692,164 A | 9/1987 | Dzemeshkevich et al. | |
| 4,747,848 A | 5/1988 | Maini | |
| 5,047,082 A | 9/1991 | Tanabe et al. | |
| 5,123,919 A | 6/1992 | Sauter et al. | |
| 5,139,515 A | 8/1992 | Robicsek | |
| 5,197,979 A | 3/1993 | Quintero et al. | |
| 5,272,909 A * | 12/1993 | Nguyen | A61F 2/2472 600/481 |
| 5,376,112 A | 12/1994 | Duran | |
| 5,545,215 A | 8/1996 | Duran | |
| 5,670,708 A * | 9/1997 | Vilendrer | G01M 99/00 73/37 |
| 5,814,096 A | 9/1998 | Lam et al. | |
| 5,862,806 A | 1/1999 | Cheung | |
| 5,891,195 A | 4/1999 | Klostermeyer et al. | |
| 6,001,126 A | 12/1999 | Nguyen-Then-Nhon | |
| 6,090,140 A | 7/2000 | Gabbay | |
| 6,264,691 B1 | 7/2001 | Gabbay | |
| 6,299,638 B1 | 10/2001 | Sauter | |
| 6,352,554 B2 | 3/2002 | De Paulis | |
| 6,390,447 B1 | 5/2002 | Mosher | |
| 6,482,228 B1 | 11/2002 | Norred | |
| 6,783,556 B1 | 6/2004 | Gabbay | |
| 6,875,230 B1 | 4/2005 | Morita et al. | |
| 6,976,952 B1 | 12/2005 | Maini et al. | |
| 7,018,404 B2 | 3/2006 | Holmberg et al. | |
| 7,258,698 B2 | 8/2007 | Lemmon | |
| 7,261,732 B2 | 8/2007 | Justino | |
| 7,422,603 B2 | 9/2008 | Lane | |
| 7,488,346 B2 | 2/2009 | Navia | |
| 7,575,592 B2 | 8/2009 | Woo | |
| 7,618,447 B2 | 11/2009 | Case et al. | |
| 7,625,403 B2 | 12/2009 | Krivoruchko | |
| 7,641,667 B2 | 1/2010 | Chinn et al. | |
| 7,641,686 B2 | 1/2010 | Lashinski et al. | |
| 7,686,844 B2 | 3/2010 | Case et al. | |
| 7,717,952 B2 | 5/2010 | Case et al. | |
| 7,806,920 B2 | 10/2010 | Duran | |
| 7,972,376 B1 | 7/2011 | Dove et al. | |
| 9,289,282 B2 | 3/2016 | Olson et al. | |
| 9,498,317 B2 | 11/2016 | Gautam et al. | |
| 9,585,748 B2 | 3/2017 | Wright | |
| 9,844,436 B2 | 12/2017 | De Paulis et al. | |
| 10,314,471 B2 | 6/2019 | Terliuc | |
| 2003/0110630 A1 | 6/2003 | Dehdashtian et al. | |
| 2003/0110830 A1* | 6/2003 | Dehdashtian | A61F 2/07 73/37 |
| 2003/0139805 A1 | 7/2003 | Holmberg et al. | |
| 2003/0187500 A1 | 10/2003 | Jansen et al. | |
| 2004/0139789 A1 | 7/2004 | Masters | |
| 2004/0193242 A1 | 9/2004 | Lentz et al. | |
| 2005/0143810 A1 | 6/2005 | Dauner et al. | |
| 2005/0222675 A1 | 10/2005 | Sauter | |
| 2005/0267559 A1 | 12/2005 | De Oliveira | |
| 2006/0085060 A1 | 4/2006 | Campbell | |
| 2006/0167386 A1 | 7/2006 | Drake et al. | |
| 2006/0179922 A1 | 8/2006 | Sacca | |
| 2006/0212026 A1 | 9/2006 | Abboud et al. | |
| 2006/0252990 A1 | 11/2006 | Kubach | |
| 2006/0271081 A1 | 11/2006 | Realyvasquez | |
| 2007/0156234 A1 | 7/2007 | Adzich et al. | |
| 2007/0256478 A1* | 11/2007 | Guadagnola | G01M 3/3254 73/40 |
| 2007/0284010 A1 | 12/2007 | Underwood et al. | |
| 2008/0147171 A1 | 6/2008 | Ashton et al. | |
| 2009/0093873 A1 | 4/2009 | Navia | |
| 2009/0157174 A1 | 6/2009 | Yoganathan et al. | |
| 2009/0158539 A1 | 6/2009 | Onishi et al. | |
| 2009/0192604 A1 | 7/2009 | Gloss | |
| 2009/0264993 A1 | 10/2009 | Greenan | |
| 2010/0225478 A1* | 9/2010 | McCloskey | A61F 2/2472 340/540 |
| 2010/0274351 A1 | 10/2010 | Rolando et al. | |
| 2011/0214398 A1 | 9/2011 | Liburd et al. | |
| 2012/0010697 A1 | 1/2012 | Shin et al. | |
| 2012/0255345 A1 | 10/2012 | Golinveaux | |
| 2013/0090715 A1* | 4/2013 | Chobotov | A61F 2/958 623/1.11 |
| 2015/0000780 A1 | 1/2015 | Lomax | |
| 2016/0067042 A1 | 3/2016 | Murad et al. | |
| 2016/0081829 A1 | 3/2016 | Rowe | |
| 2016/0266004 A1 | 9/2016 | Van Nest et al. | |
| 2016/0270913 A1 | 9/2016 | Campbell et al. | |

FOREIGN PATENT DOCUMENTS

| | | |
|---|---|---|
| EP | 0169259 A1 | 1/1986 |
| EP | 2478871 A2 | 7/2012 |
| WO | 03007795 A2 | 1/2003 |
| WO | 2006/013234 A1 | 2/2006 |
| WO | 2014105839 A1 | 7/2014 |

OTHER PUBLICATIONS

"Biplex Product Ordering Information," Biplex Brochure, B307/1E, Vascutek, a Terumo Company, SRenfrewshire, Scotland, UK.

10th Anniversary Gelweave Valsava Brochure, Vascutek, a Terumo Company, Renfrewshire, Scotland, UK.

Stentless BioValsalva Brochure, Vascutek, a Terumo Company, Renfrewshire, Scotland, UK.

Sundaram et al., "CT Appearance of Thoracic Aortic Graft Complications," American Roentgen Ray Society, AJR May 2007; pp. 1273-1277.

Di Bartolomeo et al., "Bio-Valsalva Prosthesis: 'new' conduit for 'old' patients," Institutional CardioVascular and Thoracic Surgery Sep. 1, 2008, pp. 1062-1066, Department of Cardiac Surgery, University of Bologna, Bologna, Italy.

Maselli et al., "Adjustable Sinotubular Junction for Aortic Valve Reimplantation Procedures," Ann Thorac Surg 2007, 83:700-2, Cardiothoracic Department, Azienda Ospedaliera Universitaria, Pisa, Italy.

"Thoracic and Thoracoabdominal Graft Geometries," Gelweave Brochure, Vascutek, a Terumo Company, Renfrewshire, Scotland, UK.

Koehler Elan Stentless Aortic Porcine Bioprosthesis, http://surgicaltechnology.com/15-149-CS-Page2-.html, printed Oct. 17, 2012.

"David I Reimplantation Procedure: Implant Technique," Gelweave Valsalva Brochure, Vascutek, a Terumo Company, Renfrewshire, Scotland, UK.

Sagi, H. Advanced leak test methods, Assembly Magazine, Jan. 1, 2001, BNP Media, Troy, Michigan, USA.

* cited by examiner

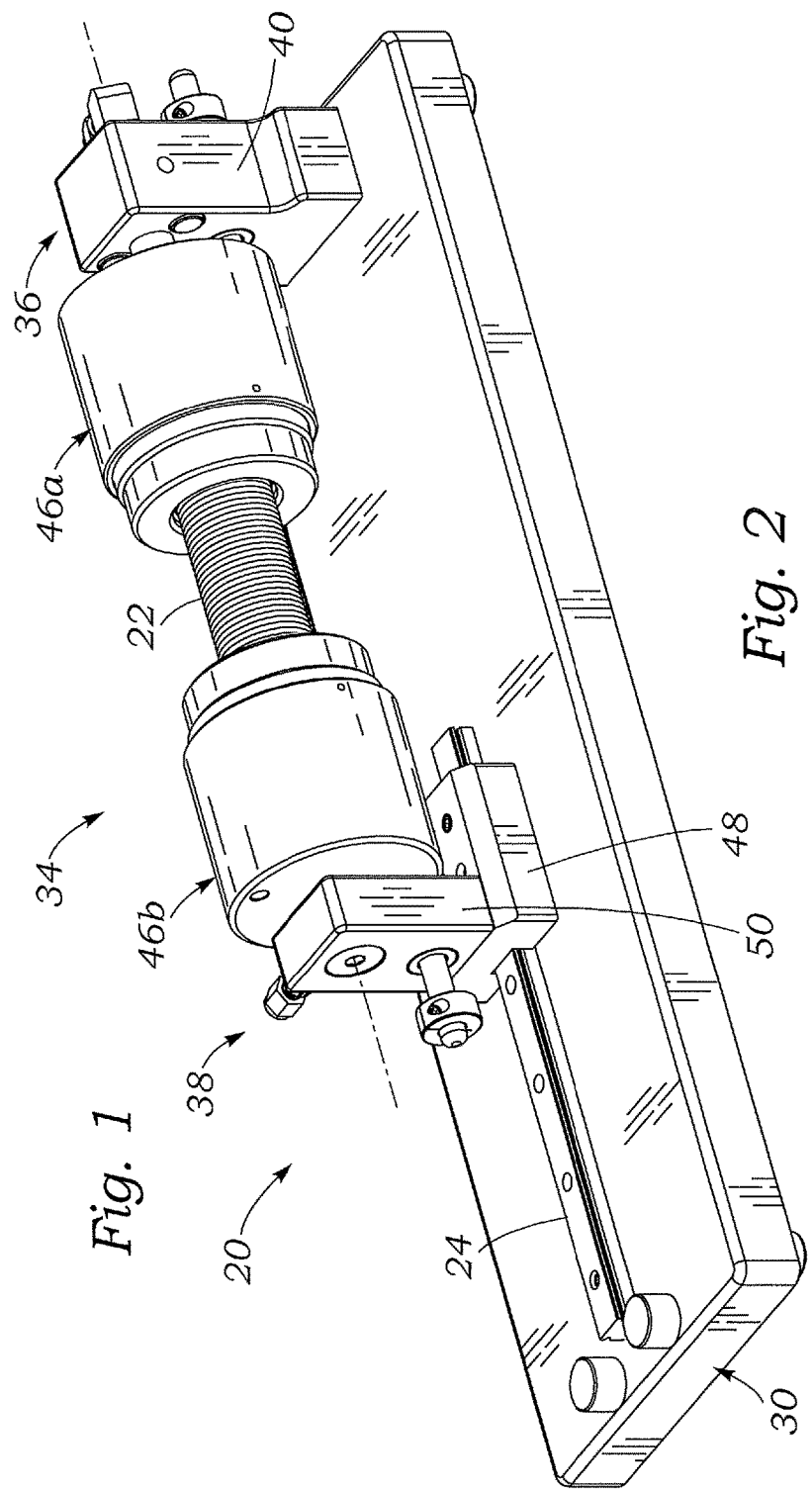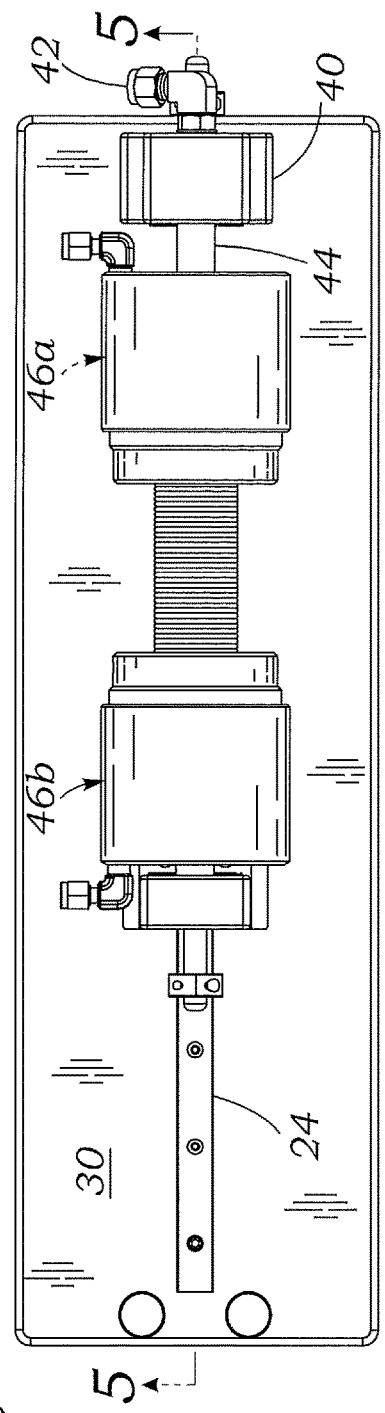

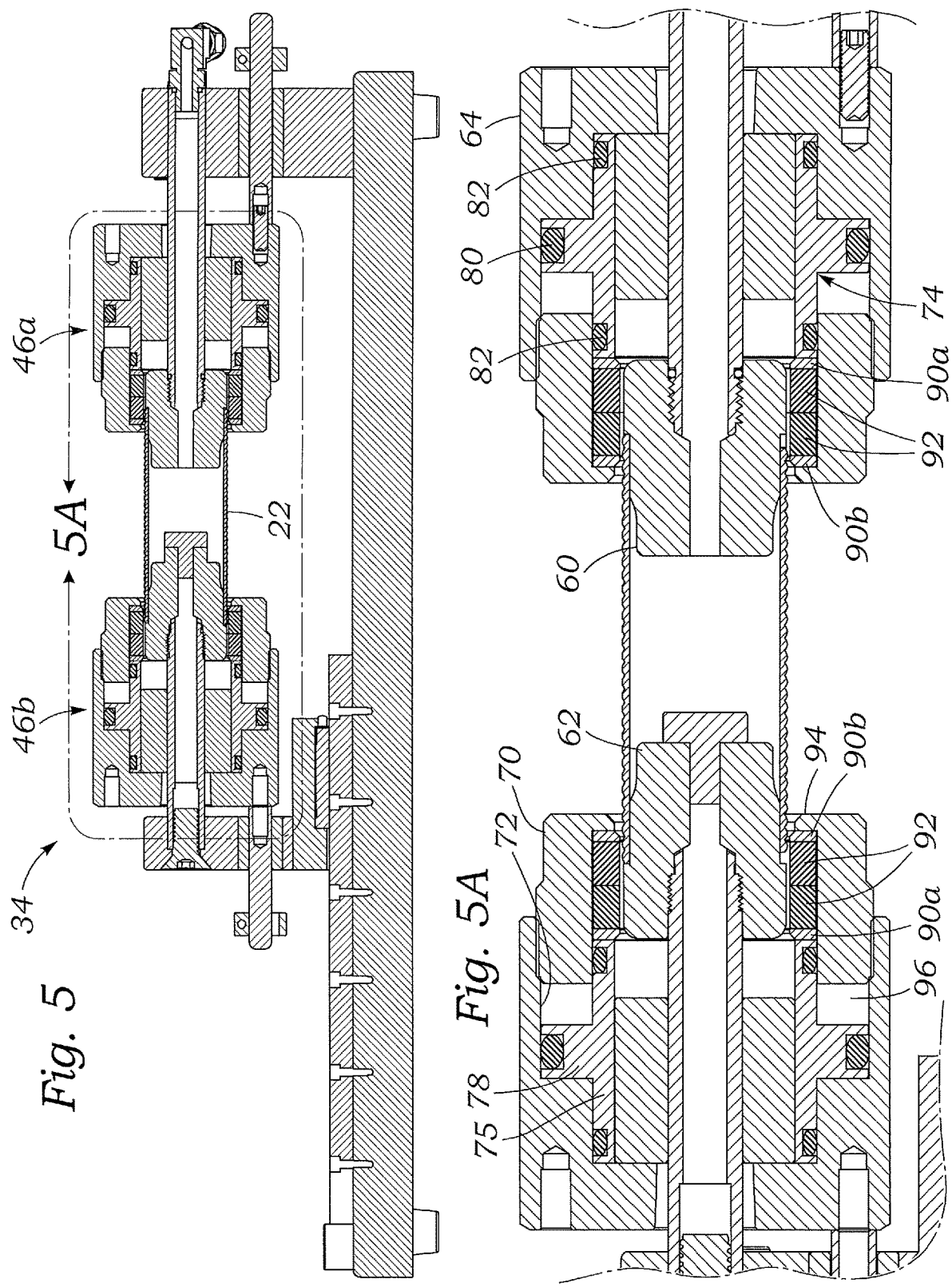

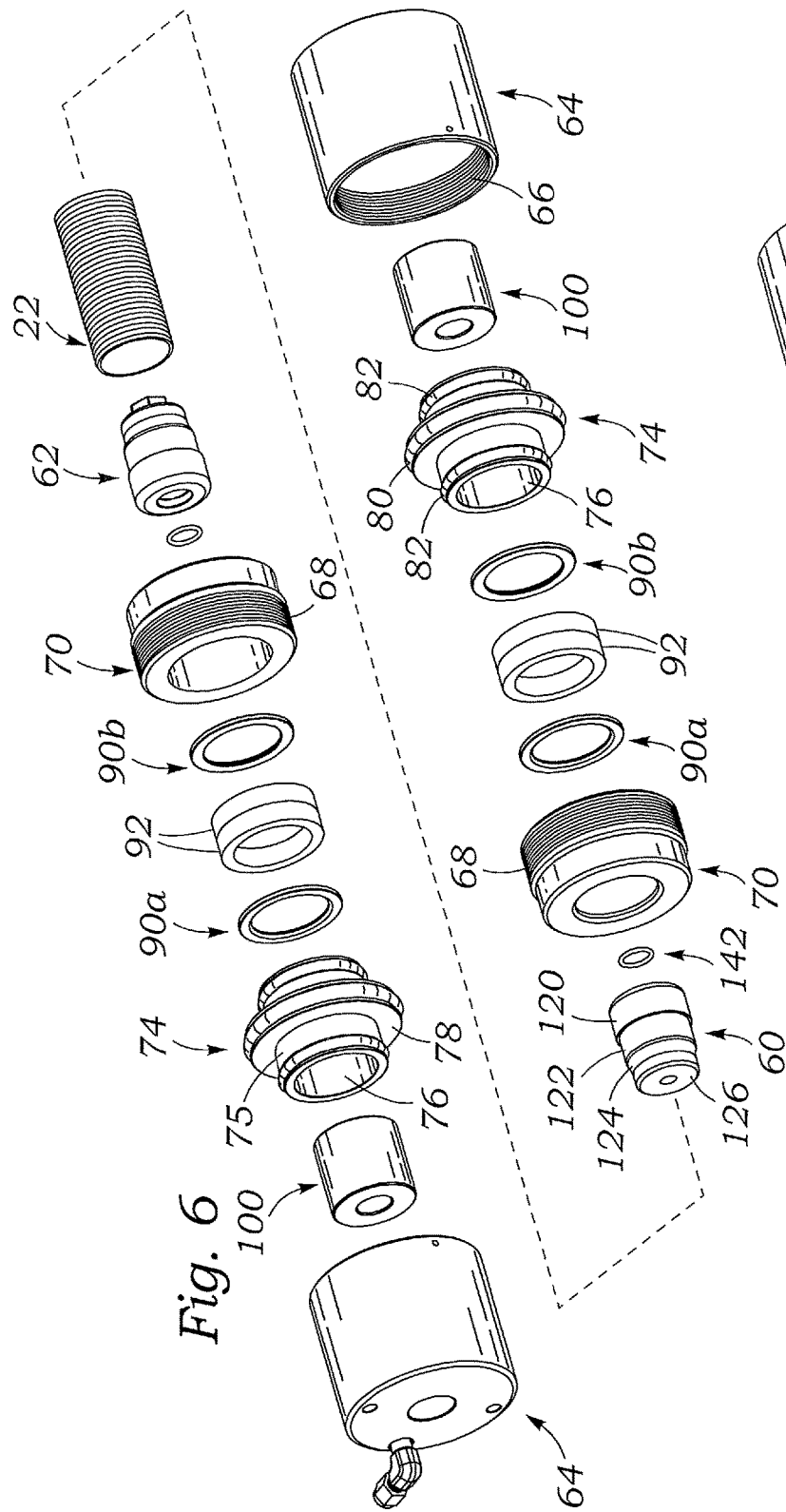
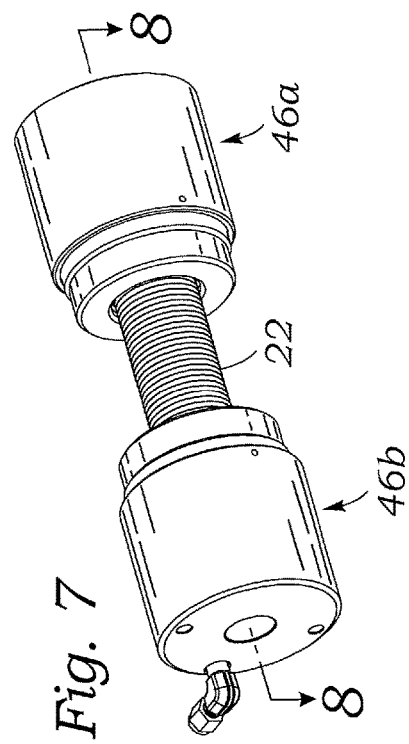

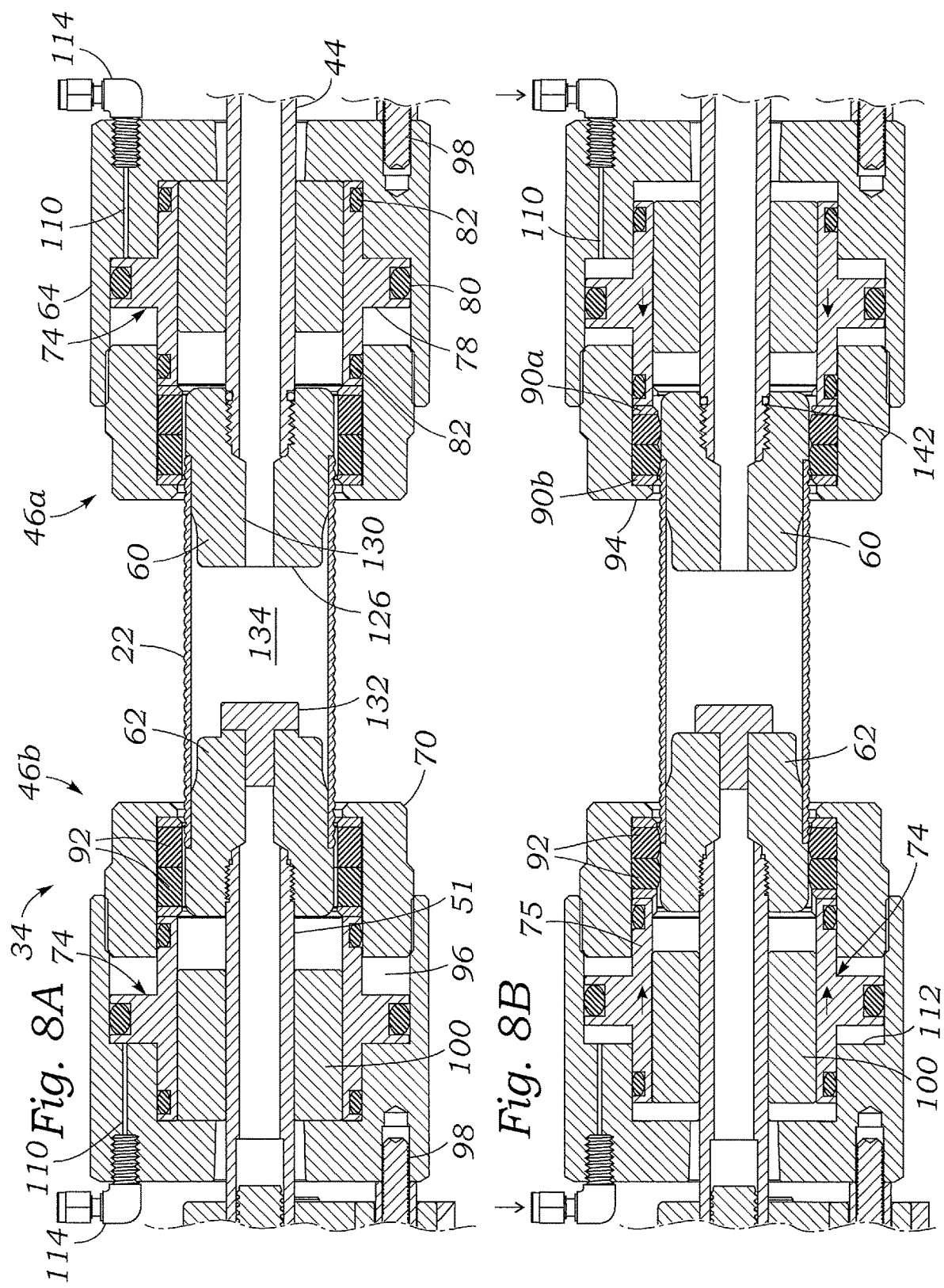

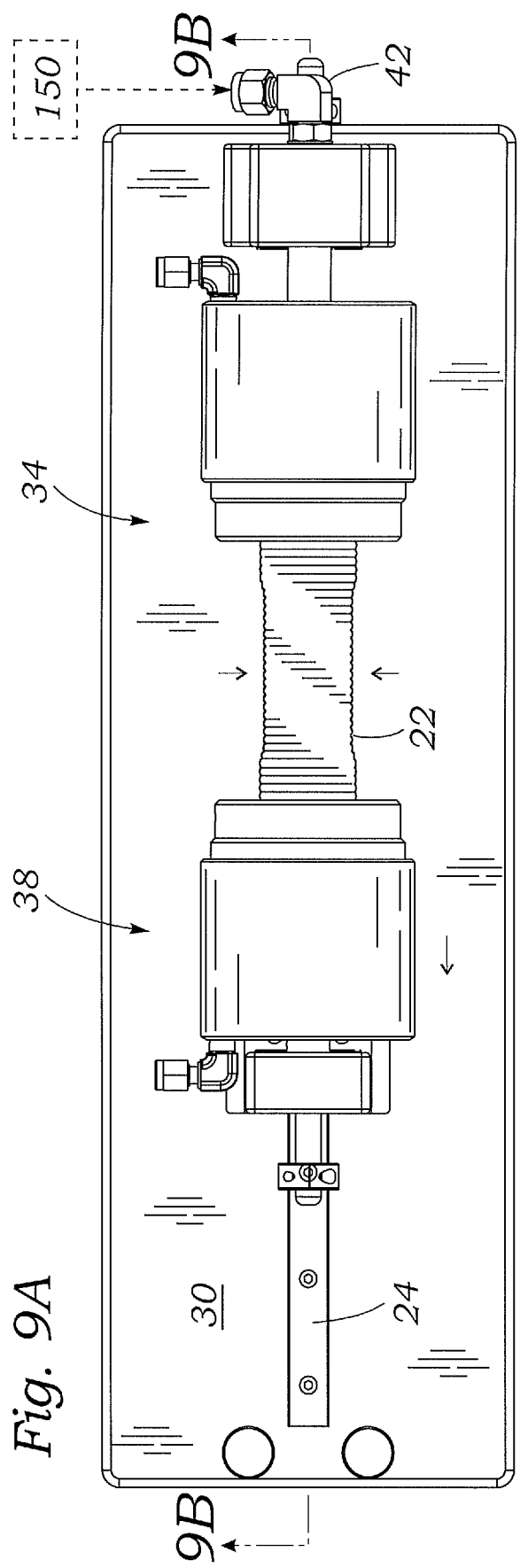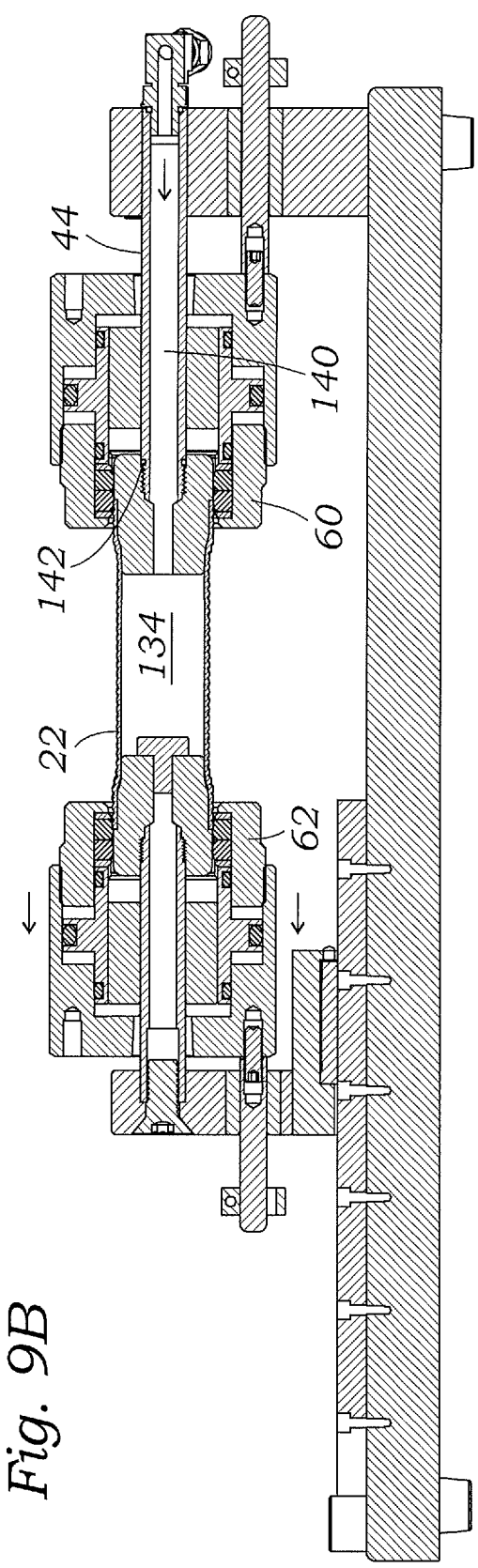

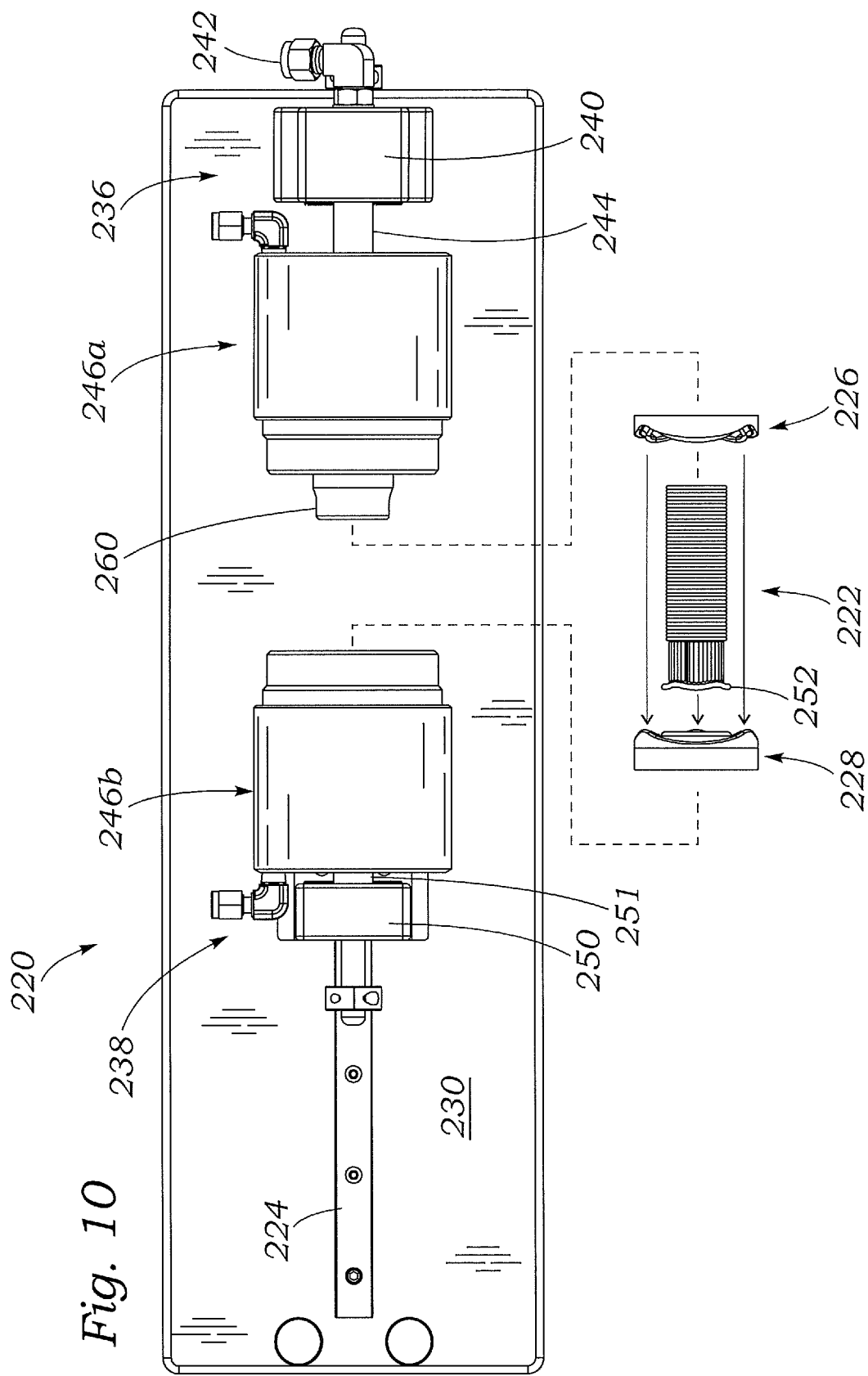

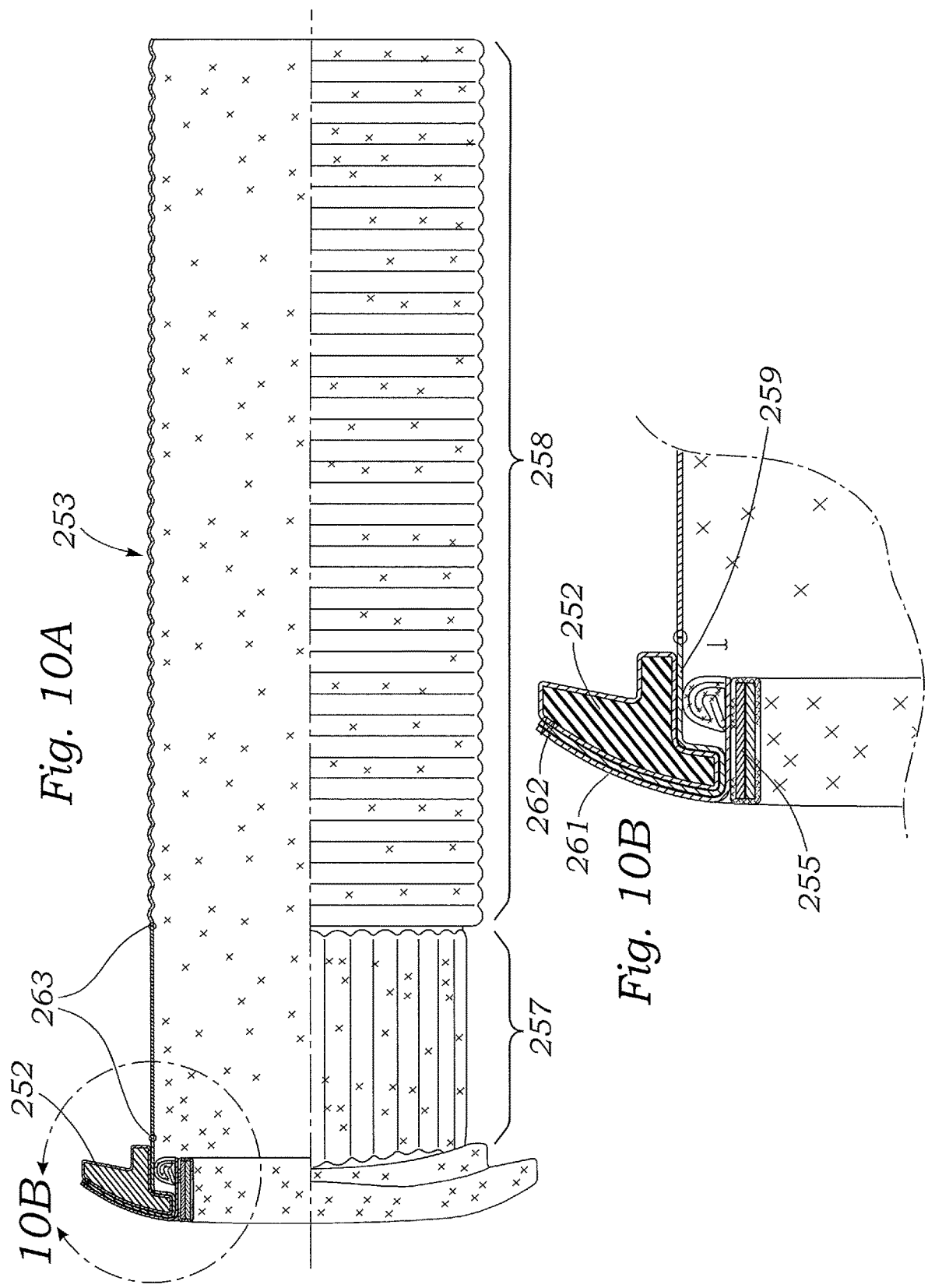

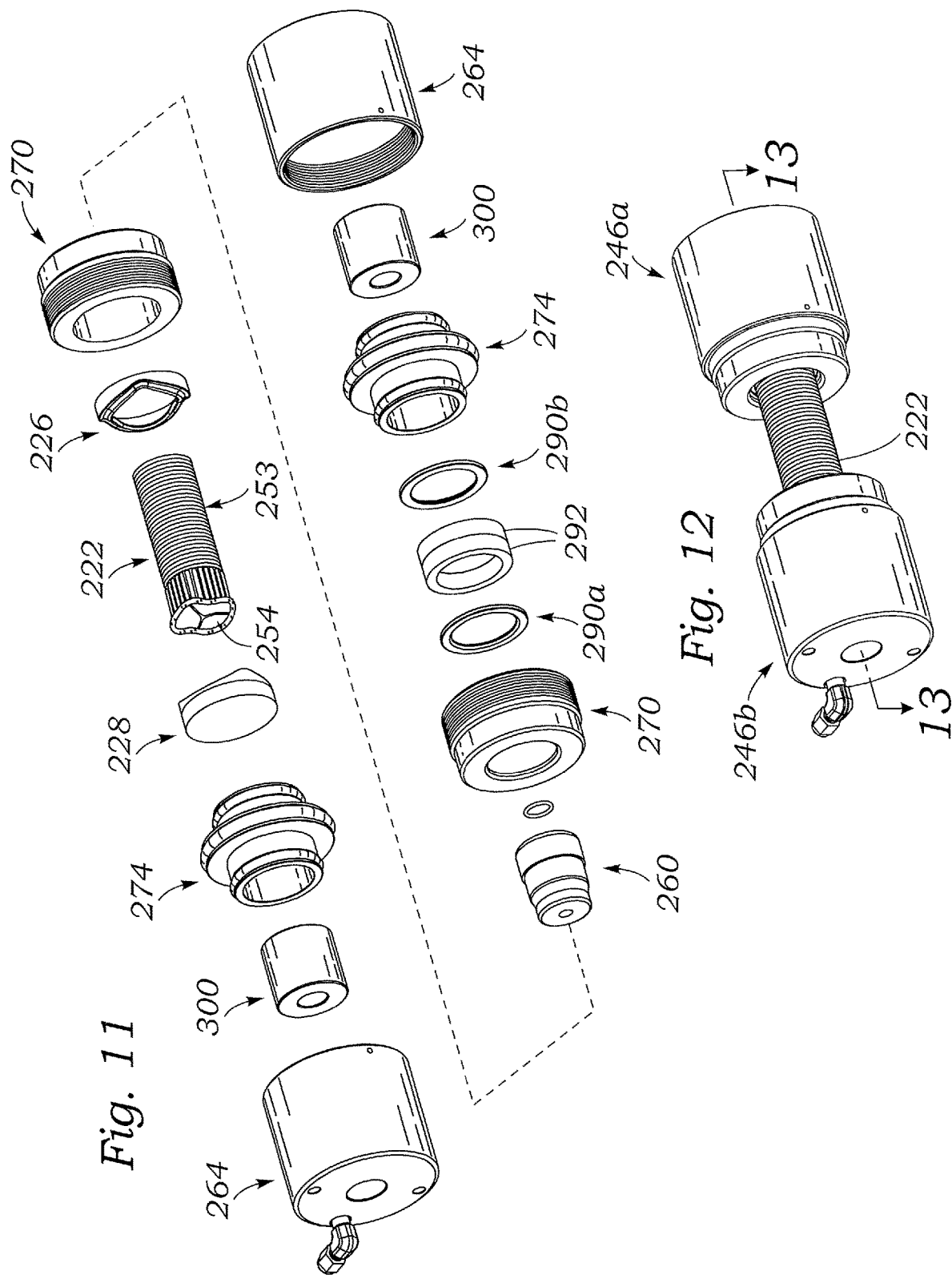

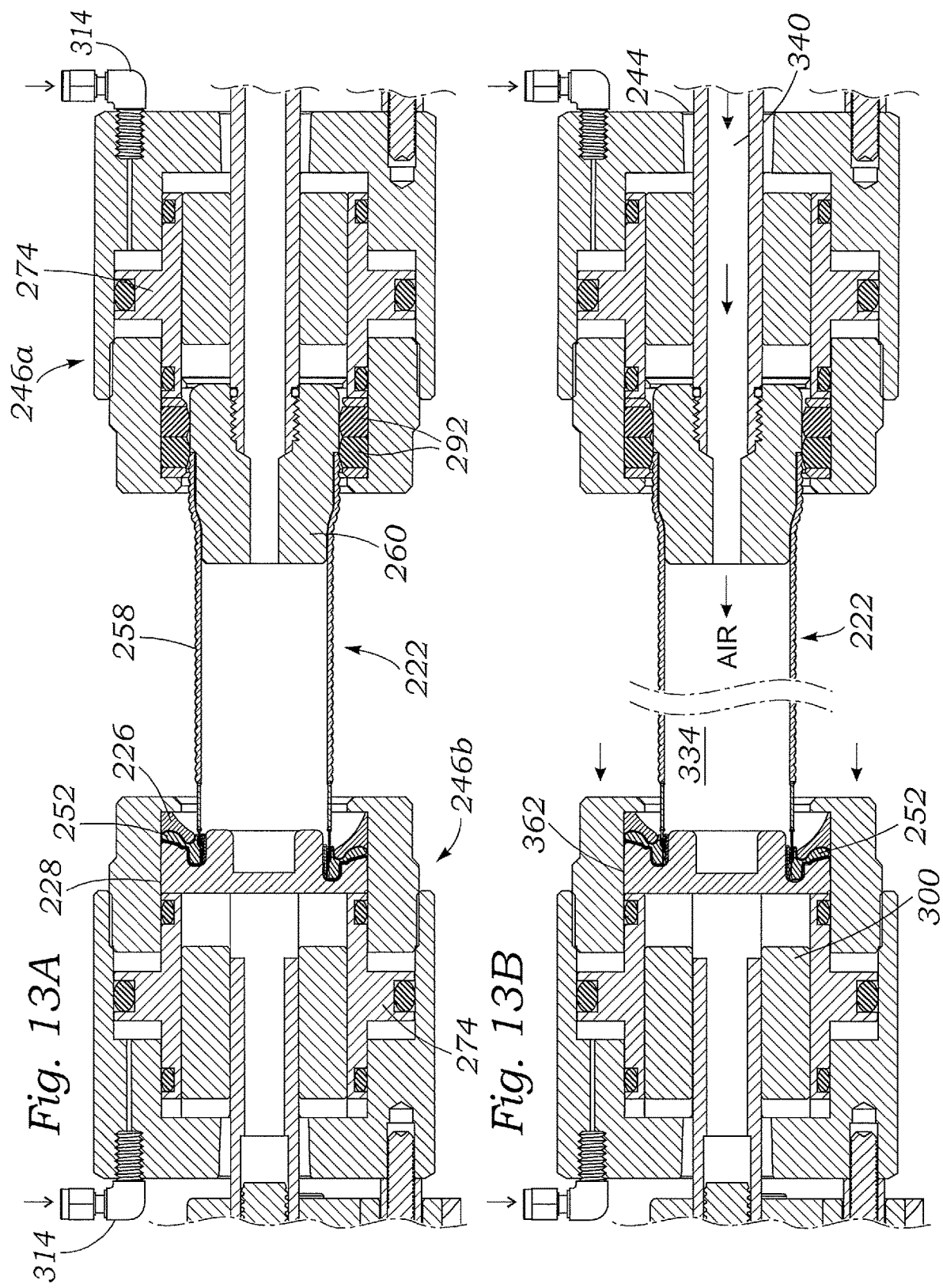

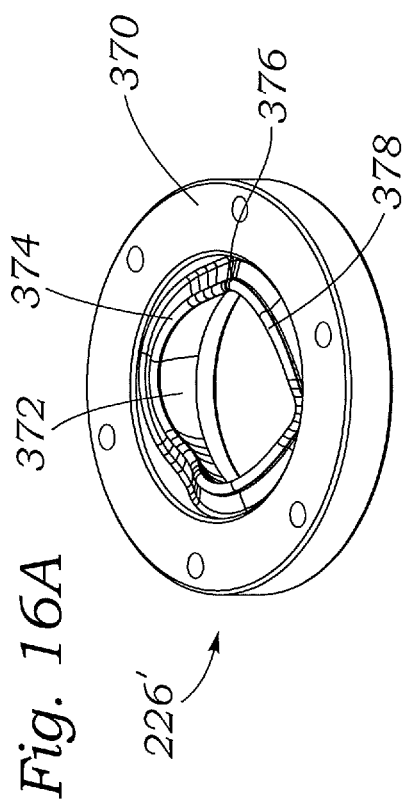
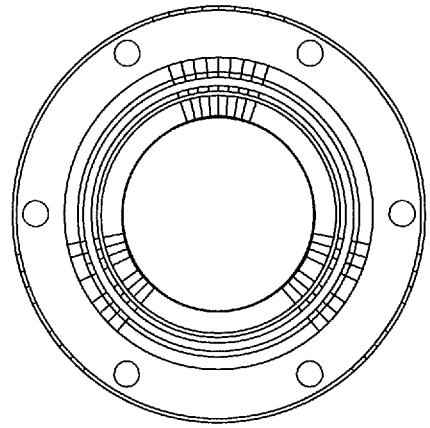
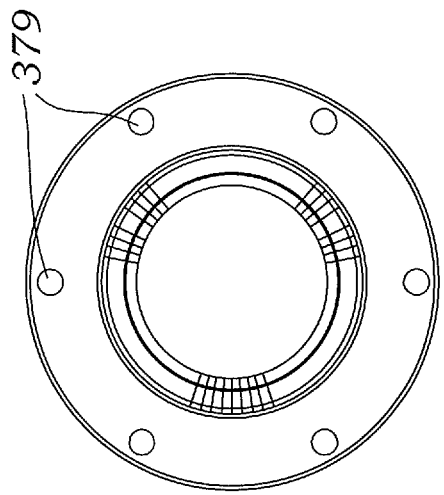
Fig. 16A  Fig. 16B  Fig. 16C  Fig. 16D

METHODS OF LEAK TESTING A SURGICAL CONDUIT

RELATED APPLICATIONS

This application is a continuation of U.S. application Ser. No. 15/065,720, filed Mar. 9, 2016, which claims the benefit of U.S. Provisional Patent Application No. 62/131,134, filed Mar. 10, 2015, each of which is incorporated by reference herein.

FIELD OF THE INVENTION

The present disclosure relates to systems and methods for leak testing surgical conduits, in particular, for leak testing valved conduits.

BACKGROUND OF THE INVENTION

Surgical valved conduits or grafts, including a prosthetic vascular conduit with an associated prosthetic valve to control flow of blood through the conduit, may be used for various purposes including, for example, the replacement of the aortic valve in conjunction with the ascending aorta. The aorta is the largest blood vessel in the human body, carrying blood from the left ventricle of the heart throughout the body. The ascending aorta is the first section of the aorta, which stems from the left ventricle and extends to the aortic arch. The aortic valve is located at the root of the ascending aorta and controls the blood flow by permitting blood to flow from the left ventricle into the ascending aorta while preventing or restricting blood flow in the opposite direction.

In the so-called Bentall procedure, the combined pathologies of ascending aorta and aortic valve are replaced. There are a number of combined conduits and valves on the market. Prior bioprosthetic valved conduits, as with bioprosthetic heart valves, are stored in a liquid preserving or preservative solution, and thus the conduits are formed of woven polyester without a bioresorbable sealant. Although such conduits are suitable in certain situations, and tend to seal relatively quickly to the body from tissue ingrowth, too much blood can initially seep through their walls after implantation, which may be detrimental. Uncoated fabric such as polyethylene terephthalate (PET) has a high leakage rate, and thus the surgeon needs to pre-clot the graft with patient's blood before use. Others have proposed using a non-bioresorbable sealant layer, such as silicone, for example, as described in U.S. Patent Publication No. 2008/0147171 to Ashton, et al., published Jun. 19, 2008, but such layered conduits tend to be relatively thick-walled and not very flexible, and so are not preferred. For example, Bio-Valsalva™ porcine aortic-valved conduits (Vascutek, Renfrewshire, Scotland, UK) include either three layers with an inner woven polyester, central elastomeric membrane, and outer ePTFE wrap, or two layers without the outer ePTFE layer. Nevertheless, such grafts still produce unacceptable leaking.

Consequently, some surgeons prefer conduits or grafts in which porous tubular structures, such as woven polyester (e.g., DACRON® polyethylene terephthalate (PET), Invista, Wichita, Kans.), are impregnated with bioresorbable materials such as gelatin, collagen, or albumin. For instance, Gelweave Valsalva™ Grafts (Vascutek, Renfrewshire, Scotland, UK) are gelatin sealed, aortic root grafts indicated for aortic root replacement. These conduits are not porous initially, and thus prevent blood loss, but the sealant medium eventually degrades by hydrolysis when exposed to water after implantation and is replaced by natural tissue ingrowth. Gelatin in the graft can also be treated in such a way as to cause cross-linking between amine groups in the gelatin molecules, rendering the gelatin more resistant to hydrolysis.

Conduits or grafts sealed using bioresorbable materials that include bioprosthetic heart valves are not pre-assembled because the liquid sterilant in which tissue valves are stored will eventually wash the bioresorbable sealing medium (gelatin, collagen, albumin, etc.) out of the permeable conduit material. Because of the benefits of using sealed conduits or grafts and because of the positive attributes of bioprosthetic heart valves, surgeons couple the two components together at the time of surgery, post-storage. Recently, so-called dry tissue heart valves have been developed, for example, described in U.S. Pat. No. 7,972,376 (Dove, et al.), in which bioprosthetic heart valves are pretreated with an aldehyde-capping agent prior to dehydration and sterilization. U.S. Patent Application Publication 2013/0325111 A1 to Campbell, et al. discloses a valved conduit that utilizes such a dry tissue valve connected within a tubular conduit sealed with a bioresorbable material. The Campbell valved conduit may be stored dry in a pre-assembled state, thus eliminating the time-consuming process of securing the two components together in the operating theater.

There remains a need for improved manufacturing techniques for valved conduits that ensure long term viability and efficacy, in particular in ensuring that the valved conduits will not leak excessively.

SUMMARY

The present application relates to systems and methods for leak testing conduit grafts or aortic-valved conduit devices that have coatings or sealants that may be functionally impacted when exposed to fluids such as water or saline, or where exposure to such fluids is undesirable due to the requirement for drying after testing.

Embodiments of the leak testing systems and methods disclosed herein are intended to be non-destructive so that each commercial product may be tested if desired. Some embodiments of the test method avoid functional impact to the portion of the device exposed to the test medium, do not require preparation of solutions, and/or allow for faster testing and simpler setup.

An exemplary embodiment of the leak testing system and method uses air as a medium to test for permeability/leakage of a part, for example, the graft or aortic-valved conduit. The part is first plugged or clamped on both ends to create a seal on each end. A variety of plug/clamp designs may be used for this purpose. One end of the assembly is fluidly connected to an inlet port of a leak tester that is capable of mass-flow testing. A lumen of the part is then pressurized with air, and a mass air-flow test performed. This embodiment of the test method subjects the part to air flow, and the measured change in air flow corresponds to an air leak rate from the part.

In an alternative embodiment of the test method, the part is internally pressurized with air for a first, typically short, period of time, the pressure is allowed to settle or equilibrate for a second, typically brief period of time, and the pressure decay is measured as air leaks from the part. A pressure decay threshold is identified to distinguish a passing from a failing part. For instance, the part may be internally pressurized to about 16 kPa (about 2.3 psi), and then monitored for a period of time. If the lumen pressure decays by more than 50% from the starting pressure within a predetermined time period, such as 0.6 seconds, then the part is deemed defective. Of course, these thresholds are variable depending on the type of conduit, application, and starting pressure, among other variables.

Existing test methods are either destructive or require a drying period for the part. Since embodiments of the test methods disclosed herein use air, they are non-destructive and require no post-test drying period. Therefore, embodiments of the test methods allow 100% inspection of parts, and/or repeated testing of the same sample. Depending on the clamp design contacting the graft, some slight disruption of the gelatin or collagen may occur at the clamp interface. In some of these cases, a slightly longer graft may be specified for the in-process graft design, and this segment may be trimmed off after the leak inspection, leaving the final desired graft length for the end product. With air, no solution storage or mixing is required. The part may be pressurized relatively quickly, and no solution evacuation or clean up is required.

A method of manufacturing a valved conduit is also disclosed, which includes first assembling a valved conduit including a bioprosthetic valve having bioprosthetic tissue coupled to a conduit sealed with a bioresorbable medium. The method includes leak testing each valved conduit using air, and sealing the conduits deemed acceptable in dry packaging. The bioprosthetic heart valve preferably includes prosthetic tissue that has been treated such that the tissue may be stored dry for extended periods without degradation of functionality of the valve. For example, the tissue may be cross-linked using glutaraldehyde or other aldehyde containing agents, treated with a capping agent, and dehydrated with a glycerol solution. The bioprosthetic heart valve may have separate bovine pericardial leaflets or a whole porcine valve. The sealed conduit includes a tubular matrix impregnated with a bioresorbable medium such as gelatin or collagen. The heart valve may be sewn to the end of the conduit or coupled thereto with a snap-fit connection to limit handling of the two treated components and provide a hemostatic seal with minimal assembly complexity.

BRIEF DESCRIPTION OF THE DRAWINGS

FIG. 1 is a perspective view of an exemplary leak testing fixture having a surgical conduit therein with one end adapted to freely slide along a track;

FIG. 2 is a top plan view of the leak testing fixture with the surgical conduit therein of FIG. 1;

FIG. 5 is a vertical cross-section along a midline of the exemplary leak testing fixture, and FIG. 5A is enlarged view of the surgical conduit therein;

FIGS. 6 and 7 are perspective exploded and assembled views, respectively, of a manifold assembly for sealing both ends of a surgical conduit and applying pressure within a lumen therein;

FIGS. 8A and 8B are horizontal cross-sections of the manifold assembly taken along line 8-8 of FIG. 7 illustrating the leak testing fixture before and after introducing pressurized gas to clamp and seal both ends of the surgical conduit;

FIGS. 9A and 9B are top plan and vertical cross-sectional views of the leak testing fixture after pressurizing the interior of the surgical conduit with gas, causing the left-hand portion of the manifold assembly to be displaced to the left (in the illustrated orientation);

FIG. 10 is a top exploded plan view of an alternative leak testing fixture, a valved conduit, and complementary end clamps for sealing one end of the valved conduit;

FIGS. 10A and 10B are partial cutaway views of an exemplary valved conduit that may be leak tested by the systems described herein;

FIGS. 11 and 12 are perspective exploded and assembled views, respectively, of an alternative manifold assembly for the leak testing fixture of FIG. 10 for sealing both ends of the valved conduit and pressurizing a lumen therein;

FIGS. 13A and 13B are horizontal cross-sections of the alternative manifold assembly taken along line 13-13 of FIG. 12 illustrating using pressurized gas to clamp and seal both ends of the valved conduit and after application of pressurized gas within the interior of the valved conduit, causing the left-hand portion of the alternative manifold assembly to be displaced to the left;

FIGS. 16A-16D are perspective and orthogonal views of an alternative first end clamp for use in the alternative manifold assembly.

DETAILED DESCRIPTION OF CERTAIN EMBODIMENTS

Figure 3:
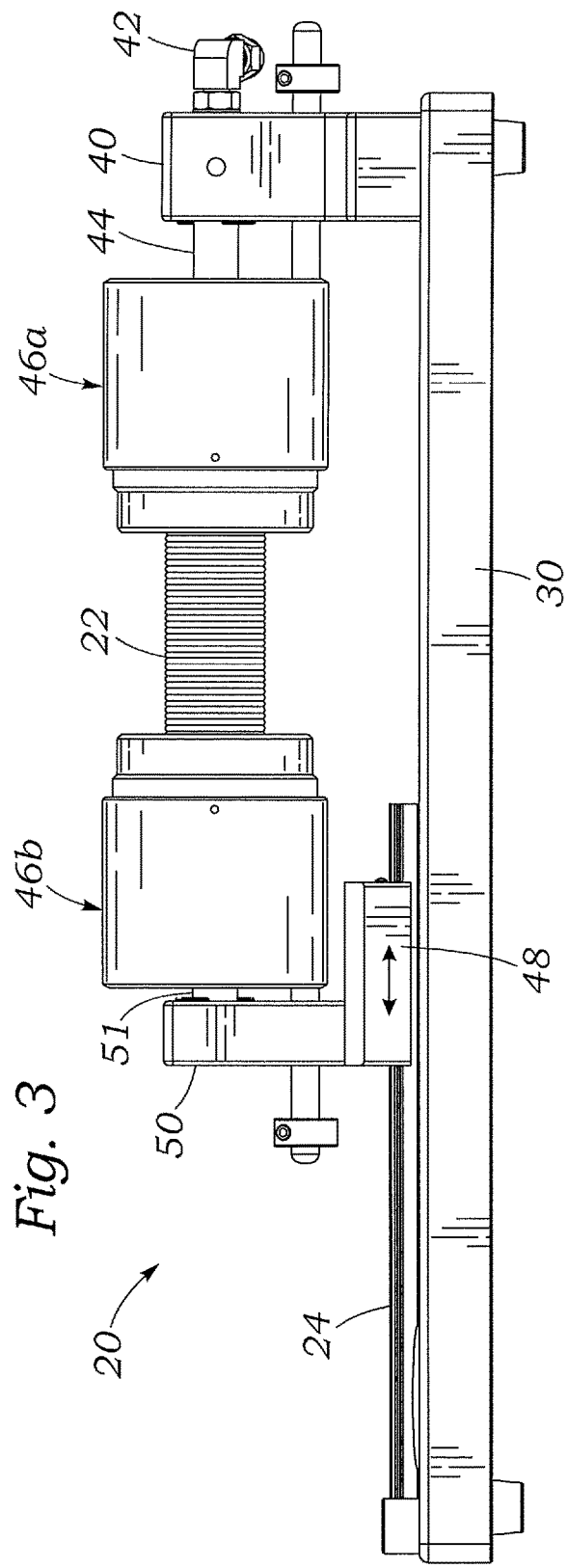
FIGS. 3 and 4A/4B are side and opposite end elevational views, respectively, of the exemplary leak testing fixture.

The present application discloses several systems for leak testing surgical conduits or grafts using a pressurized gas, such as air, as a testing fluid. In a preferred embodiment, pressurized air is the gas, although any gas that is non-destructive and non-reactive (inert) to the particular conduit being tested may be used, for example, oxygen, nitrogen, helium, argon, carbon dioxide, hydrogen, hydrocarbons, hydrofluorocarbons, fluorocarbons, fluorochlorocarbons, hydrofluorochlorocarbons and combinations thereof. As used herein, the term "air" includes all suitable gas test fluids, except where context indicates otherwise. The use of a gas instead of a liquid testing fluid can preserve the surgical conduit, which may comprise porous tubular structures such as woven polyester (e.g., DACRON® PET, Invista, Wichita, Kans.) impregnated with bioresorbable materials such as gelatin, collagen, and/or albumin. In contrast, leak testing with liquid testing fluids can destroy the efficacy of the bioresorbable material. However, embodiments of the disclosed test fixtures may be useful for leak testing using pressurized fluids in general (i.e., including liquids and supercritical fluids), and such usage is contemplated. For instance, testing of samples of conduits for experimental or validation purposes may be done with the current systems using fluids such as saline. A pressurized "gas" is distinct from a pressurized "fluid" as a gas is compressible, and in some embodiments, dry. The term "dry", as used herein, means that the gas may contain water vapor, but at a concentration or relative humidity to permit non-destructive testing and/or to not require post-testing drying of the tested device. The term "dry" does not require that the gas be anhydrous, although anhydrous gases are within the scope of the term. The term "inert gas", as used herein, means that the gas is substantially non-reactive or does not appreciably damage the tested device. The term "inert" does not require that the gas be a group 18 or noble gas, although such gases are within the scope of the term.

The term "surgical conduit" refers to a typically tubular length of material that is used as an implant to at least partially replace the function of a native section of the vasculature or heart, such as the ascending aorta. A conduit has a lumen for fluid flow. The testing methods described herein are useful for all types of conduits or grafts, and thus the term is used generally to refer to straight grafts, bifurcated grafts, branched grafts, and the like. The terms "conduit" and "graft" are used interchangeably herein, with the understanding that "graft" means a graft that functions as a conduit. Those of skill in the art will understand that the test fixtures described herein may be modified to accommodate different types, shapes, and sizes of conduits.

The leak testing systems and methods of the present application are particularly well-suited to testing valved conduits. The term "valved conduit" refers to a surgical conduit that is coupled with or incorporates a one-way valve. The test systems and methods are particularly well-suited for leak testing conduit grafts such as aortic conduits, and in particular, for valved conduits such as aortic-valved conduits, which include a prosthetic aortic valve on one end coupled with a tubular section of conduit to replace the ascending aorta. Some embodiments of aortic valve conduits including side branches extending from a tubular main body for coupling to the outwardly extending coronary arteries are also contemplated for leak testing as described herein, for example, with the side branches plugged, tied off, or otherwise closed for the leak test. Advantageously, a dry, bio-prosthetic heart valve coupled with a conduit impregnated with a sealing agent may be leak tested with air in a non-destructive manner, as will be explained below.

Current standards (ISO 7198) for permeability/leakage testing of grafts in general suggest the use of water or buffered saline as the test fluid. These leak test methods, when used on grafts coated with sealants such as gelatin or collagen, are destructive in nature. Exposure of the part to fluids such as saline or water initiates hydrolysis of the gelatin/collagen, which may compromise in vivo sealing properties thereof. A destructive method may be adequate for design verification testing, in which the tested parts are not intended to be re-used, but introduces limitations, for example, where repeat testing on the same sample may be desired. An in-process manufacturing inspection should be non-destructive.

Figure 4A:
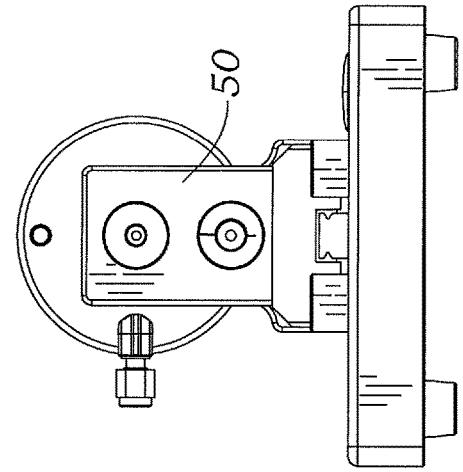
Figure 4B:
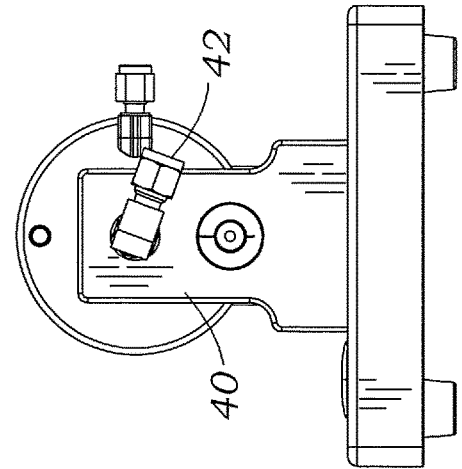

FIG. 1 is a perspective view and FIG. 2 a top plan view of an exemplary leak testing fixture 20 having a surgical conduit 22 mounted therein with one end of the testing fixture permitted to freely slide along a track 24. FIGS. 3 and 4A/4B are side and opposite end elevational views, respectively, of the exemplary leak testing fixture 20. The test fixture 20 comprises a generally rectangular horizontal base 30 elongated along a length axis relative to a width dimension. The linear track 24 extends from near one long end to approximately a midpoint of the base 30 in the illustrated embodiment. The linear track 24 has other configurations in other embodiments, for example, depending on the relative dimensions and/or configurations of the base and other components of the testing fixture. A manifold assembly 34 mounts on the base 30 with a first end 36 fixed to the base and a second end 38 coupled to slide on the base in the long direction along the track 24. For the sake of orientation, the right end of the test fixture 20 corresponds to the fixed first end 36, and the left end of the test fixture corresponds to the sliding second end 38 in the drawings.

The first end 36 includes an upstanding bracket 40 fixed on the base 30 and has a gas flow port (not shown in FIGS. 1 and 2) therethrough in fluid communication with an inlet fitting or test gas port 42 on an outer side and with a support shaft 44 on an inner side. The support shaft 44 connects to and provides structural support for a first manifold 46a. The second end 38 includes a carriage 48 having a lower channel (not numbered) adapted to closely fit over and slide on the linear track 24. Those skilled in the art will understand that other arrangements are possible, for example, with the channel and track disposed on the carriage and the base, respectively. An upstanding frame member 50 fixed on the carriage 48 provides structural support for a second manifold 46b. Specifically, an elongated shaft 51 seen in FIG. 3 connects to and provides structural support for the second manifold 46b. In some embodiments, the bracket 40 is equipped to slide longitudinally, either in addition to or instead of the frame member 50. In the description of the manifold components, the term "inner" refers to the longitudinal direction toward the other manifold, and the term "outer" refers to the direction away from the other manifold. In other embodiments, the inlet fitting 42 has a different location, for example, extending from a side of the bracket 40, from the base 30, from the support shaft 44, or from the first manifold, or from any location that is fluidly connectable with the lumen of the conduit or graft to-be-tested, as will become apparent below.

The first and second manifolds 46a, 46b have generally cylindrical profiles with coincident horizontal axes. Those skilled in the art will understand that manifolds with axially symmetric profiles, for example, cylindrical, feature simplified fabrication and/or assembly; however, other profiles are useful in other contexts, and certain components can have profiles different than other components in some embodiments, for example, the mandrels, as discussed in greater detail below. The conduit 22 is held at either end by the first and second manifolds 46a, 46b, as will be described below. The illustrated surgical conduit 22 comprises a tubular structure with circumferential corrugations for kink-resistance and longitudinal and bending flexibility. In embodiments in which the conduit has a different shape, for example, in which the ends are axially offset and/or in which the ends are non-parallel, the relative positions of the first and second manifolds are adjusted to account for the shape of the conduit.

With reference now to the vertical cross-sections of FIGS. 5 and 5A, and the exploded view of FIG. 6, details of components of the manifold assembly 34 (assembled in FIG. 7) are shown. The first and second manifolds 46a, 46b are substantially similar and their components will be given the same element numbers aside from a pair of mandrels 60, 62 which are configured differently.

Both manifolds 46a, 46b include an exterior housing 64 having internal threads 66, as seen in FIG. 6, that mate with external threads 68 on tubular caps 70. In other embodiments, at least a portion of the exterior housing is received within the tubular cap, while in other embodiments, an inner face of the exterior housing butts against an outer face of the cap to provide a substantially fluid-tight seal. Furthermore, in other embodiments, the exterior housing 64 and tubular cap 70 are assembled using another type of fastener or coupling means, for example, any combination and/or multiple of a bayonet mount, bolt, pin, lock ring, quick-connect, latch, clip, clamp, magnet, wedge, threading, and the like. In some embodiments, the alternative fastening system permits rapid assembly and disassembly of the manifolds, for example, for ease of cleaning, servicing, and/or reconfiguration for testing different types of devices. Some embodiments include a sealing means between the exterior housing and tubular cap, for example, a gasket or O-ring. As best seen in FIG. 5A, the combination of the exterior housings 64 and tubular caps 70 define internal stepped cavities 72 that enclose pneumatic components for sealing both ends of the tubular conduit 22. In particular, relatively large pistons 74 reciprocate axially within the cavities 72. As seen best in FIG. 6, each piston 74 includes a generally tubular main body 75 having a cylindrical lumen 76 that extends at a constant diameter therethrough, and an enlarged ring-shaped central flange 78 with a peripheral groove that receives a primary O-ring 80. Two secondary O-rings 82 are also fitted within external grooves on the reduced diameter ends of the main body 75. FIG. 5A shows that the primary O-ring 80 seals against a larger diameter portion of the stepped cavity 72, while an outer one of the secondary O-rings 82 seals against a smaller diameter portion thereof. An inner one of the secondary O-rings 82 seals against an inner lumen of the cap 70.

Still with reference to FIG. 5A, an inner end of the piston main body 75 abuts against a rigid circular outer washer 90a within the tubular cap 70. On its other side, the outer washer 90a abuts against a pair of elastomeric clamping rings 92 which, in turn, contact a rigid circular inner washer 90b. The assembly of the washers 90a, 90b and elastomeric clamping rings 92 is sandwiched between the piston main body 75 and a radially-inwardly directed neck or lip 94 on the inner end of the cap 70. The reader will notice annular spaces 96 formed between the central flanges 78 of the pistons 74 and the outer end of the caps 70. These spaces 96 enable linear inward movement of the pistons 74 to compress the elastomeric clamping rings 92, as will be explained below. It should be noted that although two clamping rings 92 are illustrated on both manifolds 46a, 46b, other embodiments include a different number of clamping rings on either or both of the manifolds 46a, 46b, for example a single clamping ring or greater than two. Furthermore, some embodiments independently omit either or both of the inner washer and outer washer on each manifold.

FIGS. 8A and 8B are horizontal cross-sections of the manifold assembly 34 before and after introducing a pressurized fluid causes the manifolds 46a, 46b to clamp and to seal to both ends of the surgical conduit 22. Here, the pressurized fluid is desirably a gas, such as air, though incompressible fluids, such as water, an organic liquid, or a fluorocarbon, may also be used. A user loads the conduit 22 into the manifold assembly 34 by fitting the ends around respective mandrels 60, 62, which are held in place by the respective shafts 44, 51. The outer ends of the conduit 22 extend a short distance within or into the caps 70, and at least as far as the inner one of the two elastomeric clamping rings 92. The shafts 44, 51 are secured with respect to the upstanding bracket 40 and upstanding frame member 50 (referring back to FIG. 3). Bolts 98 extend between the respective bracket 40 and upstanding frame member 50 to the corresponding exterior housings 64, which fix the housings with respect to the shafts 44, 51 and mandrels 60, 62. Furthermore, a tubular bushing 100 closely surrounds each of the shafts 44, 51 and, in turn, is closely surrounded by the pistons 74. The bushings 100 center the pistons 74 around the shafts 44, 51 but permit linear displacement thereof. Preferably, the bushings 100 are press fit within the lumen 76 of the pistons 74, and slide easily over the shafts 44, 51. In other embodiments, the at least one of the bushings is integrated with the respective piston or the shaft.

With reference still to FIGS. 8A and 8B, both of the exterior housings 64 have flow channels 110 that extend from an exterior, for example, an outer face, thereof into communication with the respective internal stepped cavities 72. More particularly, each of the flow channels 110 opens to the corresponding cavity 72 at a radially-oriented step 112 (see FIG. 8B) that initially opposes the outer face of the central flange 78 of the piston 74. An actuation fluid port 114, which is an elbow fitting in the illustrated embodiment, attaches to the outer face of the housing 64 and provides a coupling point for attaching a hose (not shown) for delivering pressurized gas to the flow channel 110, as well as for venting or releasing the actuation gas pressure. Other embodiments include a separate port for venting pressure.

FIG. 8A shows the pistons 74 in their first or outer positions prior to introduction of pressurized gas to the flow channels 110. The reader will notice slight radial gaps between the elastomeric rings 92 and the exterior of each of the mandrels 60, 62 and surgical conduit 22 thereon. Again, the annular spaces 96 shown between the central flanges 78 of the pistons 74 and the outer end of the caps 70 enable or permit inward displacement of the pistons.

The two mandrels 60, 62 preferably comprise identical main bodies each having gradually stepped radii from an outer end to an inner end. In embodiments in which at least one end of the conduits has different and/or a different diameter, the respective mandrels are shaped accordingly. With reference to FIG. 6, an outer cylindrical section 120 of the mandrel has the largest radius, and is separated from a slightly smaller middle cylindrical section 122 by a small inward step (not numbered). Another small inward step leads to an inner section 124 that tapers down in size to its inner end 126. The surgical conduit 22 has a diameter that closely fits around the middle cylindrical section 122, abutting or contacting the small step at the beginning of the largest diameter outer cylindrical section 120 in the illustrated embodiment (FIGS. 8A, 8B). Both mandrels 60, 62 have stepped-diameter axial throughbores commencing at an inner bore 130 leading to a progressively larger outer bore (not numbered) that receives the respective shafts 44, 51. A nut feature 132 or other such plug member, which is optionally threaded to mate with complementary threading in the inner bore 130, closes off the throughbore in the second mandrel 62 such that there is no gas communication with a lumen 134 within the conduit 22. Other embodiments do not include a plug so long as the manifold 46b is substantially sealed or leak-free. On the other hand, no such plug member is provided for the first mandrel 60 such that its throughbore opens to the lumen 134 and provides an internal port at the inner end 126 of the first mandrel for introducing pressurized gas therein.

FIG. 8B shows the pistons 74 displaced inwardly, as indicated by a pair of arrows superimposed on each piston, after pressurized gas is introduced into both flow channels 110 through the actuation gas ports 114. Although more than one flow channel could be provided, the axi-symmetric nature of the central flange 78 of the pistons 74, as well as the concentricity provided by the bushings 100 cause the pressurized gas to be distributed annularly around the piston and to exert a substantially even axial force thereto. As previously explained, the inner end of the piston main body 75 abuts against the circular outer washer 90a within the tubular cap 70. Inward displacement of the pistons 74 squeezes the elastomeric rings 92 between the rigid washers 90a, 90b by virtue of the caps 70 being fixed with respect to the exterior housings 64. The elastomeric rings 92 are thus deformed radially inward as indicated in FIGS. 8A and 8B so as to contact and seal against both the mandrels 60, 62 and the surgical conduit 22. That is, the elastomeric rings 92 clamp and seal the surgical conduit 22 against the rigid mandrels 60, 62, and in particular against the middle cylindrical sections 122 thereof. The gas pressure is calibrated such that the force of the pistons 74 is sufficient to cause the rings 92 to form an air tight seal against the exterior of the conduit 22, at its ends. Each piston 74 is independently actuatable and/or actuatable together. In some embodiments, the pistons 74 are actuated or displaced in the respective manifold by another method, for example, any combination of pneumatic, hydraulic, electric, magnetic, or mechanical actuation. Any pressurized gas introduced into the conduit lumen 134 reaches the inside wall of the conduit 22 at least as far as the area surrounding the tapered inner cylindrical section 124. At this point, the leak test fixture 20 is prepared for testing the conduit 22.

FIGS. 9A and 9B are top plan and vertical cross-sectional views of the leak testing fixture after introducing pressurized gas into the lumen 134 of the surgical conduit 22. More specifically, a pressurized gas is provided to the inlet fitting 42 that communicates with a hollow lumen 140 through the support shaft 44. In the illustrated embodiment, the inlet fitting 42 is used to both pressurize and vent the test fixture. Other embodiments include a separate port for venting the test gas from the test fixture. As mentioned, an inner end of the shaft 44 engages the throughbore in the first mandrel 60 such that the pressurized gas continues into the lumen 134 of the surgical conduit 22. A small O-ring 142 provides a seal between the exterior of the shaft 44 and the throughbore in the first mandrel 60, and is optional in other embodiments. Since the second mandrel 62 is sealed by nut or plug 132, and both ends of the conduit 22 are sealed, the pressurized gas can escape only through the wall of the conduit. The present testing system measures any such leakage. The pressurized gas for leak testing is desirably an inert gas such as air.

As indicated by the movement arrows in FIGS. 9A and 9B, pressurizing the conduit lumen 134 causes the left-hand or second end 38 of the manifold assembly 34 to slide on the base 30 in the long direction along the track 24 as the conduit lengthens. Extension of the corrugated conduit 22 permits this movement, and as a result the conduit contracts radially somewhat from its elongation, as shown by arrows in FIG. 9A. If the second end 38 of the manifold assembly 34 were restrained from sliding, the conduit 22 would tend to bend and possibly kink from the change in length, which potentially causes additional leakage where folds or the like expose or otherwise expand leaks, and/or masks leakage an otherwise leaky portion of the conduit surface is covered or compressed by a kinked or folded conduit surface. In some embodiments, the length of the conduit 22 does not appreciably change during the leak test. As mentioned above, if disruption of the sealant, for example, gelatin or collagen, on the sealed conduit 22 occurs at the clamp interface, a slightly longer graft may be specified, and the end segments may be trimmed off after the leak inspection, leaving the final desired graft length for the end product.

A method of leak testing a conduit is a flow test, for example, a mass air-flow test. In some embodiments of the flow test, the conduit is held at a substantially constant gas pressure, and a flow rate is measured, for example, using a mass flow meter. The conduit is then graded—for example, pass or fail, or with the measured flow rate—based on the flow rate. In one embodiment, the test or inlet fitting 42 of the test fixture 20 is fluidly connected, for example, via a hose or the conduit (not shown), to the port of an air or gas leak tester 150 (shown schematically in FIG. 9A) that is capable of mass-flow testing. The conduit 22 is then pressurized with air or a test gas through the inlet 42 to a substantially constant target pressure for a first or fill time period, and a mass flow test performed for a second or test time period at the target pressure. Finally, the lumen of the conduit is depressurized or vented. This test method subjects the tested part to air flow, and the measured change in air flow corresponds to the air-leak rate through the test sample.

The target pressure depends on factors including the type of test gas used, the structural properties of the conduit, the nature of the sealant, and the like. In some embodiments, the target pressure is selected for accurate and reproducible leak test measurements. For example, at low pressures, minor differences in a physical orientation of a conduit could result in different measured leak rates, for example, from overlapping portions of the conduit blocking leak paths. On the other hand, a target pressure that is too high could damage the sealant layer, creating new leak paths. Furthermore, the selected target pressure also depends on the properties of the test equipment. For example, in some embodiments, the mass flow meter both measures gas flow and regulates the gas pressure. Consequently, the target pressure is selected from a range of pressures that the mass flow meter is able to maintain over the test time for a typical range of conduits to-be-tested, for example, at least 3 sigma or at least 4 sigma, or at least 5 sigma of the conduits. In some embodiments, the target pressure is from about 3.5 kPa (about 0.5 psi or about 25 mm Hg) to about 70 kPa (about 10 psi or about 520 mm Hg), or from about 7 kPa (about 1 psi or about 50 mm Hg) to about 35 kPa (about 5 psi or about 150 mm Hg), or from about 14 kPa (about 2 psi or about 100 mm Hg) to about 28 kPa (about 4 psi or about 200 mm Hg). In some embodiments, the target pressure includes a narrow range of pressures, for example, where the mass flow meter controls the pressure in a discrete or quantized manner, for example, by opening and closing a valve controlling a source of pressurized gas at a constant pressure that is higher than the target pressure.

The fill time is selected to pressurize the conduit to the target pressure rapidly, without causing any damage, for example, from sudden pressure changes. In some embodiments, a pressurization rate during the fill time is non-linear, for example, at a slower rate as the pressure in the conduit approaches the target pressure. For example, in some embodiments, the pressurization rate is sigmoidal, including three fill stages, with a slower initial fill rate, a faster main fill rate, and a slower final fill rate. Other embodiments include two fill stages, for example, a faster initial fill rate, and a slower final fill rate. In some embodiments, the fill time will depend on the leakiness of the conduit being tested. Embodiments of the fill time are from about 0.1-500 s, from about 1-60 s, from about 2-30 s, or from about 5-15 s.

The test time is sufficiently long to obtain a stable, accurate, and reproducible flow rate, and as such, will depend on both the characteristics of the conduit to-be-tested, as well as of the flow meter. Embodiments of the test time are from about 0.1-500 s, from about 1-60 s, from about 2-30 s, or from about 5-15 s. The vent time is selected for rapid venting of the pressure without damaging the conduit, for example, from mechanical stress arising from sudden longitudinal contraction of the conduit. Embodiments of the vent time are from about 1-30 s, or about 5-10 s. In one embodiment, a target pressure of about 16 kPa (about 2.32 psi or about 120 mm Hg), a fill time of about 10 seconds, a test time of about 10 seconds, and a vent time of about 8 seconds are used.

Another test method is a static test that includes mounting the test part to the test fixture 20, as described above, pressurizing the part with air or gas for a first time period (e.g., a short time), allowing the pressure to settle for a second time period (e.g., a short time), and measuring the pressure decay as air leaks from the part for a third time period. A pressure decay threshold is identified to distinguish a passing from a failing part. In one embodiment, a target pressure of about 16 kPa (about 2.32 psi, or about 120 mm Hg), a fill time of about 10 seconds, a settle time of about 0.1 seconds, and test times of between about 0.1-0.8 seconds are used.

After completion of the leak test, the pistons 74 are deactuated, for example, by releasing fluid pressure at the actuation fluid ports 114. In the illustrated embodiment, gas in the annular space 96 returns the piston 74 from the second position illustrated in FIG. 8B to the first position shown in FIG. 8A. Optionally, a reduced pressure, for example a source of vacuum, is fluidly connected to the actuation fluid port to retract the piston. Other embodiments include a component or mechanism for returning the piston to the first position, for example, at least one of spring, mechanical, pneumatic, hydraulic, electric, or magnetic mechanism or actuator. After the release of the piston pressure, the elastomeric rings 92 relax back to their uncompressed states, thereby releasing the ends of the conduit 22 therefrom, thereby permitting removal of the ends of the graft 22 from the respective mandrels 62.

Some embodiments of the leak test system are at least partially automated, for example, any combination of clamping the conduit, unclamping the conduit, leak testing the conduit, or recording the results of a leak test.

Up to now the leak testing system 20 has been described in the context of testing a straight tube conduit 22, for example, one formed of a homogeneous graft material. As mentioned, other conduits may be tested with certain modifications to the system facilitating the testing, for example, for mounting the test part to the testing fixture. For instance, FIGS. 10-15 illustrate a modified system 220 for leak testing a valved conduit 222. Some aspects of the system 220 are common with the earlier-described system 20, and such features will be given the same element numbers albeit incremented by 200 (e.g., mandrel 60=mandrel 260). Unless otherwise specified or apparent, alternative configurations or arrangements discussed in conjunction to the leak testing fixture 20 also apply to the leak testing fixture 220.

FIG. 10 is a top, partially exploded plan view of the modified leak testing fixture 220, the valved conduit 222, and complementary end clamps 226, 228 for sealing each end of the valved conduit. FIGS. 11 and 12 are perspective exploded and assembled views, respectively, of the alternative fixture 220.

The test fixture 220 comprises a generally rectangular horizontal base 230 elongated along a length axis relative to a width dimension. A linear track 224 extends from near one long end to approximately a midpoint of the base 230. A manifold assembly mounts on the base 230 with a first end 236 fixed to the base and a second end 238 coupled to slide on the base in the long direction along the track 224.

The first end 236 of the manifold assembly includes an upstanding bracket 240 fixed on the base 230 and having a gas flow port therethrough in communication with an inlet fitting 242 on an outer side, and with a support shaft 244 on an inner side. The support shaft 244 connects to and provides structural support for a first manifold 246a. The second end 238 includes a carriage having a lower channel (not numbered) adapted to closely fit over and slide on the linear track 224. An upstanding frame member 250 and shaft 251 fixed on the carriage provides structural support for a second manifold 246b. In FIG. 10, the valved conduit 222 is shown exploded from between the two manifolds 246a, 246b, and flanked by the complementary end clamps 226, 228. As will be explained, the end clamps 226, 228 come together to seal around a sewing flange 252 on one end of the conduit 222 within the second manifold 246b, while the opposite end of the conduit extends over a mandrel 260 and is sealed within the first manifold 246a. In some embodiments, the positions of the first and second manifolds are interchanged.

With reference now to FIGS. 10A and 10B, the valved conduit 222 preferably includes a tubular graft portion 253 and a subassembly including a one-way flow valve attached to a first end of the graft portion. The one-way flow valve permits fluid flow from one end of the tubular graft portion 253 to the other but prevents flow in the opposite direction. In some embodiments, the one-way flow valve is a prosthetic heart valve. In some embodiments, a valved conduit including a fully assembled one-way flow valve subassembly is leak tested. In other embodiments, it is advantageous and/or efficient to test just those components of the one-way flow valve subassembly that attach to the tubular graft portion 253, such as with sutures, so as to verify the valved conduit does not leak around its exterior. Components such as valve leaflets are generally internal to a surrounding support structure, and thus are not directly connected to the graft portion 253, and consequently, are not typically additional sources of leakage. As such, in some embodiments, some or all internal components of the flow valve subassembly may be added after the leak test without affecting the integrity of the conduit 222.

In the illustrated embodiment, the one-way flow valve comprises a bioprosthetic heart valve having a sewing flange 252 surrounding a peripheral support structure 255 and a plurality of flexible bioprosthetic tissue leaflets (not shown) attached to the support structure and extending inward to provide the air-flow occluding surfaces. The support structure 255 may take a variety of forms, but typically includes metallic or plastic rings with an axial component to provide peripheral support for flexible leaflets. For instance, some embodiments of the valve have substantially the structure of a commercially available prosthetic heart valve, for example, a Carpentier-Edwards Magna® pericardial aortic bioprosthesis (Edwards Lifesciences, Irvine, Calif.). Alternatively, various other types of flow valves may be utilized to form the valved conduit 222, including other bioprosthetic valves or mechanical valves. For example, some embodiments of the valve may have mechanical bi-leaflets, and the support structure 255 includes a ring with internal pivots to which the leaflets are pivotably mounted. A preferred valved conduit having a bioprosthetic valve mounted therein is disclosed in International Patent Publication WO 2014/0145811 to Murad, filed Mar. 17, 2014, the contents of which are expressly incorporated herein by reference.

The illustrated conduit 222 is particularly suited for attachment within the aortic annulus and ascending aorta, and as such, closely matches the aortic root anatomy and includes three sections: a sinus section 257 having axial corrugations or pleats, an aortic section 258 having circumferential corrugations or pleats, and a skirt section 259 (FIG. 10B) that is used to couple the graft portion to the valve, or to exterior components thereof. The circumferentially corrugated sidewall of the aortic section 258 provides longitudinal flexibility and radial compressibility while ensuring that the graft does not unduly radially expand under the pressure of blood flowing therethrough. The longitudinal corrugations of the sinus section 257 are more radially expandable than the circumferential pleats to allow expansion at that location into the Valsalva sinuses adjacent to the aortic valve. The conduit 222 desirably has an overall length of from a few centimeters to about 10-15 centimeters. In the preferred embodiment, the conduit 222 comprises a textile structure, such as a woven and/or non-woven PET (DACRON® PET, Invista, Wichita, Kans.), sealed with a bioresorbable medium such as gelatin or collagen.

With respect to the enlarged view of FIG. 10B, the skirt section 259 is shown extending between the sewing flange 252 and the peripheral support 255 of the valve, and wrapping underneath (on the left side, in FIG. 10B) the sewing flange. The peripheral support 255 typically has one or more fabric coverings, including an extended section 261 that wraps underneath the sewing flange 252 on the outside of the skirt section 259, and is secured thereto with a peripheral line of stitches 262. Additional stitches may be provided between the various fabric sections, although stitches are preferably avoided in the tubular areas of the conduit 222 to reduce leakage through any holes formed thereby. Two circumferential seams 263 (FIG. 10A) connect the sinus section 257 to both of the aortic section 258 and skirt section 259. In other embodiments, the skirt section is secured to the one-way valve subassembly in a different way. As will be explained below, the leak test fixture 220, and in particular the end clamps 226, 228, provide a fluid-tight seal around the sewing flange 252 such that a pressurized gas can only escape through the wall of the tubular conduit 222.

FIG. 11 illustrates the components of the modified manifold assembly exploded for a better understanding of the differences between the two manifolds 246a, 246b. The first manifold 246a, which is on the end fixed with respect to the base 230 in the illustrated embodiment, houses components that seal around the end of the tubular aortic section 258 of the conduit 222. In this embodiment, the first manifold 246a preferably has the same construction as the manifolds 46a, 46b described above for sealing the ends of the straight tubular graft 22. In particular, an outer housing 264 has internal threads that mate with external threads on a cap 270. The combination of the outer housing 264 and cap 270 define an internal cavity within which is mounted a piston 274 having a throughbore that receives a tubular bushing 300 that slides on the shaft 244 (FIG. 10). As explained above, the piston 274 contacts and compresses a sandwiched assembly of inner and outer washers 290a, 290b and elastomer rings 292. Finally, the aforementioned mandrel 260 mounts to an inner end of the shaft 244, as is shown in FIGS. 13A and 13B.

The second manifold 246b also includes an outer housing 264 to which an inner cap 270 couples with threads. Within the cavity defined by the housing 264 and cap 270, a piston 274 mounted to a tubular bushing 300 is arranged to slide axially. Because the second end of the conduit 222 has the one-way valve, and in particular the outward sewing flange 252, the piston 274 acts on a combination of the two end clamps 226, 228 instead of flat washers or rings, as will be described in greater detail below. Some embodiments of the outer housing 264 and inner cap 270 of the second manifold 246b include a fastener system or coupling means that is configured for rapid assembly and disassembly thereof, as described above in conjunction with manifolds 46a, 46b, the utility of which will become apparent.

Now with reference to FIGS. 13A and 13B, horizontal cross-sections of the alternative manifold assembly taken along line 13-13 of FIG. 12 first illustrate introduction of pressurized gas to clamp and seal both ends of the valved conduit 222, and then introduction of a pressurized gas for leak testing. Again, both the pressurized gas for clamping and pressurized gas for leak testing are preferably air. FIG. 13A shows pressurized gas entering each of two inlet fittings 314 on both manifolds 246a, 246b. As in the earlier-described clamping configuration, the pressurized gas displaces the respective pistons 274 inwardly, or towards the middle of the assembly. In the first manifold 246a, the piston 274 causes axial compression and the radially-inward bulging of the two elastomeric rings 292, as discussed in detail above. This clamps the tubular end of the conduit 222 against the mandrel 260. In the second manifold 246b, the piston 274 causes the two end clamps 226, 228 to compress the resilient sewing flange 252 therebetween. The outer of the two end clamps 228 has a solid or closed midsection or center, and thus closes off and seals the end of the conduit 222 having the partially or fully assembled one-way valve subassembly. Because both ends of the conduit 222 are sealed, the pressurized gas can only escape through the wall of the conduit.

FIG. 13B illustrates introduction of a pressurized gas within the interior of the valved conduit 222. More particularly, the pressurized gas will be introduced through the inlet fitting 242 shown in FIG. 10 which is in fluid communication with an inner lumen 340 of the shaft 244. The lumen 340 in turn leads to throughbore in the mandrel 260 opening to an internal lumen 334 of the conduit 222. Pressurizing the inside of the conduit 222 in this manner causes the conduit 222 to lengthen as the pleats in the aortic section 258 unfold. Consequently, the movable second manifold 246b slides to the left on the track 224, as indicated by the movement arrows in FIG. 13B, to accommodate the lengthened conduit 222. Once again, this linear displacement of one of the manifolds prevents the conduit 222 from bending, kinking, or otherwise distorting. Furthermore, the elongation of the conduit 222 causes a slight contraction in the diameter of the aortic section 258.

The methods of testing for leaks in the valved conduit 222 are similar to those described above. That is, a mass air or gas flow test may be performed which subjects the conduit 222 to air or gas flow, and the measured change in air flow corresponds to an air leak rate from the test sample. Alternatively, a static test in which the valved conduit 222 may be pressurized with air for a short period of time, and then the pressure decay measured as air leaks from the conduit. It should be noted that clamping the sewing flange 252 between the end clamps 226, 228 effectively isolates the central tubular portion of the valved conduit 222 as well as the junction between the sinus section 257 and sewing flange 252 for leak testing. Consequently, the test concentrates on those portions of the conduit 222 that are most susceptible to leakage, the external portion of the valved conduit, rather than the portions that are less susceptible, for example, the seams or stitching internal to the one-way valve. When implanted, the sewing flange 252 anchors one end of the valved conduit 222 to an anatomical location such as the aortic annulus. Leakage between the flange 252 and surrounding anatomy is generally a consequence of a surgeon's skill rather than any inherent leakage in the conduit itself. Thus, end clamps 226, 228 of the leak testing system effectively remove leakage between the sewing flange 252 and tissue from the leakage measurement. On completion of the leak test, the conduit is released from the fixture as described above.

FIGS. 14A-14D show the first end clamp 226, while FIGS. 15A-15D show the second end clamp 228 complementary to the first end clamp for use in the alternative manifold assembly. The first and second end clamps 226, 228 have complementary contoured facing surfaces that generally conform to the valved conduit sewing flange 252 and clamp the flange therebetween to provide a sufficient seal against leakage.

Figure 14D:
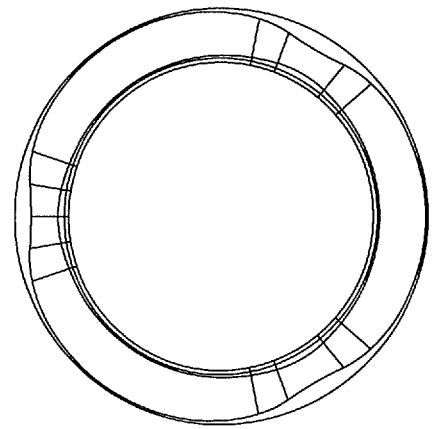
FIGS. 14A-14D are perspective and orthogonal views of a first end clamp for use in the alternative manifold assembly.
Figure 14A:
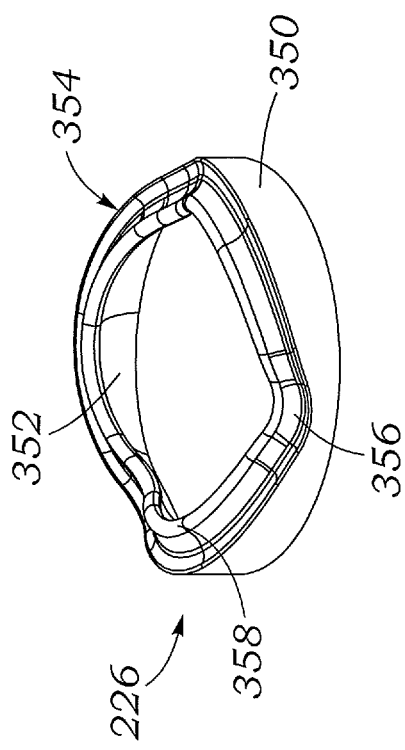
Figure 14C:
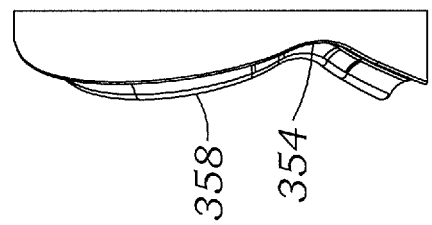
Figure 14B:
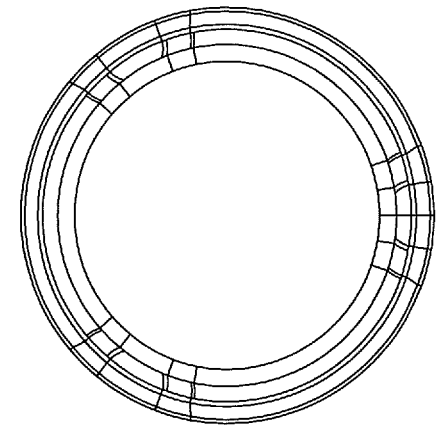
Figure 15D:
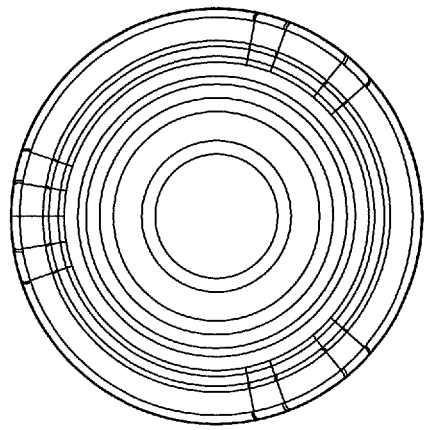
FIGS. 15A-15D are perspective and orthogonal views of a second end clamp complementary to the first end clamp for use in the alternative manifold assembly.
Figure 15A:
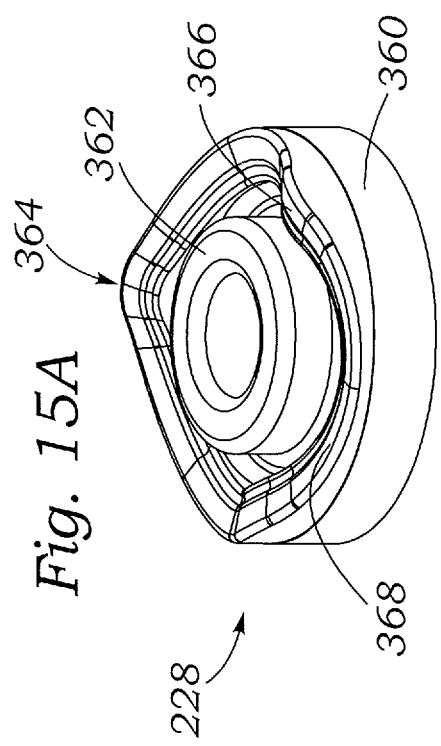
Figure 15C:
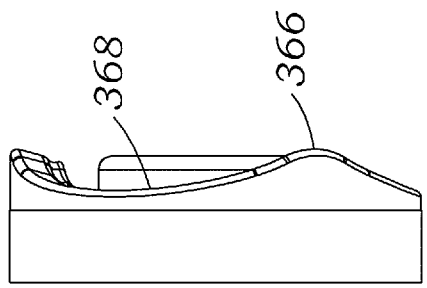
Figure 15B:
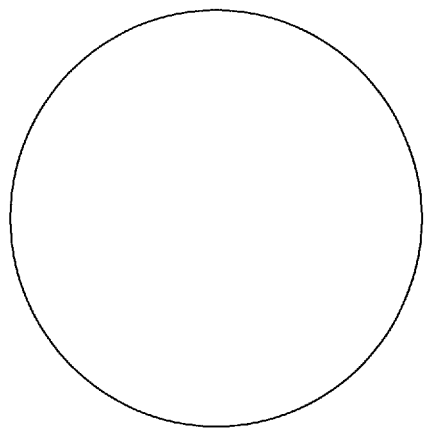
Figure 17A:
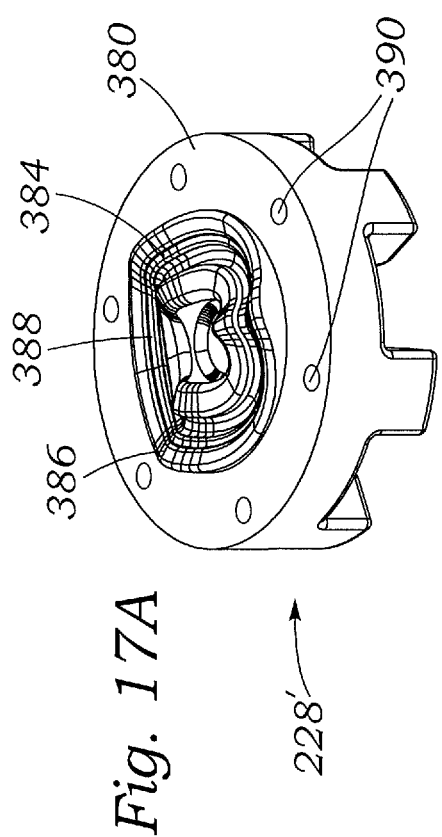
FIGS. 17A-17D are perspective and orthogonal views of an alternative second end clamp complementary to the alternative first end clamp for use in the alternative manifold assembly.
Figure 17D:
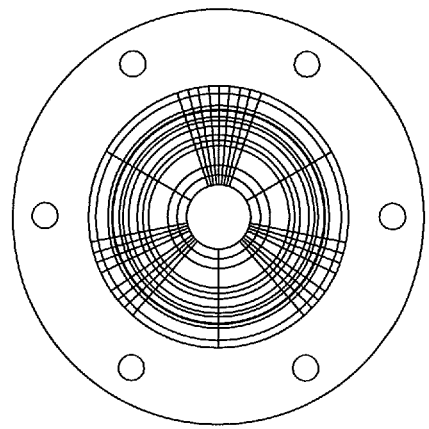
Figure 17C:
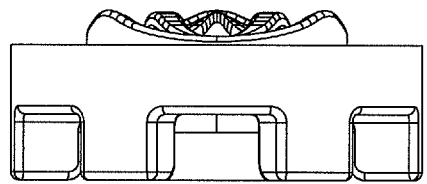
Figure 17B:
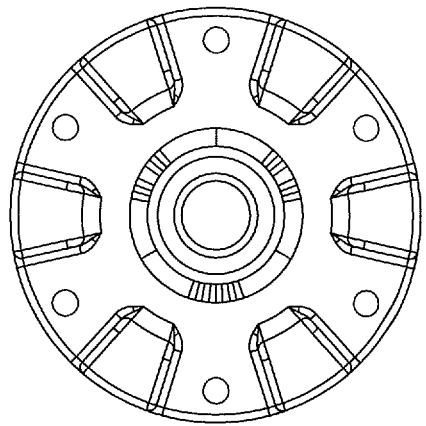

More particularly, the first or inner end clamp 226 of FIGS. 14A-14D has a generally annular body 350 with a lumen 352 therethrough. With reference to FIGS. 11 and 13A, the inner end clamp 226 fits closely around the tubular aortic section 258 of the valved conduit 222. A contoured ledge 354 on the outer face of the clamp 226 contacts an inner side of the sewing flange 252 and mirrors its shape, for example, an undulating shape in the illustrated embodiment. More particularly, the sewing flange 252 desirably has a shape that matches the aortic annulus, with three peaks for the three commissures of the annulus intermediate three valleys for the sinus regions. FIG. 14A illustrates three concave depressions 356 sized and shaped to mate with the three peaks of the sewing flange 252, and three convex regions 358 sized and shaped to mate with the three valleys. Other embodiments of the sewing flange have a different profile, for example, with two peaks and two valleys for patients with bicuspid aortic valves, and the outer face of the clamp 226' is complementary to the profile of the sewing flange.

The second end clamp 228 of FIGS. 15A-15D includes an annular body 360 with an axially-oriented annular stub 362 projecting outward therefrom. A portion of the inner face of the annular body 360 includes a contoured sealing surface 364 that contacts an outer side of the sewing flange 252 and mimics its undulating shape. In particular, alternating convex peaks 366 and concave depressions 368 around the circumference of the sealing surface 364 are sized and shaped to closely conform to the peaks and valleys of the sewing flange 252.

The clamps 226, 228 do not require screws and nuts to connect the two pieces together and are relatively lightweight and user friendly. In particular, the clamps 226, 228 are placed around the valved conduit 222 as depicted in FIG. 10 and rotationally oriented with respect to the sewing ring 252 using their matching undulating geometry. Alternatively, the clamps 226, 228 are rotationally oriented via alignment pins (not shown) that extend from one into dead-end holes in the other. The assembly of the clamps 226, 228 around the valve end of the valved conduit 222 is then inserted into cap 270 (FIG. 11) which is then screwed into outer housing 264 with the piston 274 and tubular bushing 300 therein. The piston 274 applies some tension as cap 70 is engaged to hold the assembly in place. Again, the assembled components are seen in section in FIGS. 13A and 13B.

FIGS. 16A-16D and 17A-17D are perspective and orthogonal views of embodiments of alternative first and second end clamps 226', 228', respectively. The first or inner end clamp 226' shown in FIGS. 16A-16D has a generally annular body 370 with a cylindrical lumen 372 therethrough. Much like the first embodiment of clamps 226, 228, and with respect to FIGS. 11 and 13A, the inner end clamp 226' fits closely around the tubular aortic section 258 of the valved conduit 222. A contoured ledge 374 on the outer face of the clamp 226' contacts an inner side of the sewing flange 252 and mirrors its shape, for example, an undulating shape in the illustrated embodiment. More particularly, the sewing flange 252 desirably has a shape that matches the aortic annulus, with three peaks for the three commissures of the annulus intermediate three valleys for the sinus regions.

FIG. 16A illustrates three depressions 376 sized and shaped to mate with the three peaks of the sewing flange 252, and three concave regions 378 sized and shaped to mate with the three valleys. Other embodiments of the sewing flange have a different profile, for example, with two peaks and two valleys for patients with bicuspid aortic valves, and the outer face of the clamp 226' is complementary to the profile of the sewing flange. The end clamp 226' further includes a series of axial through-holes 379 in the annular body 370 adjacent a peripheral edge thereof.

The second or outer end clamp 228' shown in FIGS. 17A-17D includes an annular body 380 with an axially-oriented shaft stub 382 projecting outward therefrom. A portion of the inner face of the annular body 380 includes a contoured sealing surface 384 that contacts an outer side of the sewing flange 252 and mimics its undulating shape. In particular, alternating convex peaks 386 and concave depressions 388 around the circumference of the sealing surface 384 are sized and shaped to closely conform to the peaks and valleys of the sewing flange 252. The end clamp 228' also includes a series of axial through holes 390 in the annular body 380 adjacent a peripheral edge thereof that align with the through-holes 379 in the first clamp 226'. Although not shown, complementary screws or bolts and nuts are inserted in the aligned through-holes 379, 390 to align and secure the two clamps 226', 228' together.

As with the first-described clamps 226, 228, and with reference to FIG. 13B, the assembly of the end clamps 226', 228' and sewing flange 252 is sandwiched between the piston 274 and a radially-inwardly directed neck (not numbered) on the inner end of the cap 270. Introduction of pressurized gas to the inlet fitting 314 on the second manifold 246b compresses the sewing flange 252 between the end clamps 226', 228'. Providing the contoured ledge 374 and sealing surface 384 helps provide an effective seal around the sewing flange 252, and avoids deforming the flange which might impact its functionality post-implant. The shaft stub 382 is shown slightly within the lumen of the tubular bushing 300, which helps the center the clamping assembly.

The present application provides techniques that are particularly useful for testing implantable valves with sealed conduits, and in particular bioprosthetic heart valves that have been dried and do not need to be stored immersed in a preservative solution. The term "dried" or "dry" bioprosthetic heart valves refers in general to bioprosthetic heart valve suitable for storage without immersion in a liquid or solution (e.g., a saluting including a preservative like glutaraldehyde), and in particular to dry storage for extended periods without loss or degradation of functionality of the bioprosthetic valve. There are a number of proposed methods for manufacturing dry bioprosthetic heart valves, and for manufacturing dry tissue suitable therefor, and the present application provides non-destructive methods of testing valved conduits having such dry valves that are processed by any of these methods. The removal of a percentage of water from the valve, and in particular, the tissue, and replacement thereof with glycerol and ethanol allows the device to be stored "dry" (i.e., glycerolized). A valved conduit including a dry bioprosthetic valve is ready for implantation without the need for a clinical rinse in saline, thereby shortening implant time. In some embodiments, "dry" bioprosthetic tissue has less than about 70% water content. In terms of practical rehydration, functional valves have at least about 70% water content. Among the important distinctions of "dry" valves (or tissue therein), however, is that they may be stored dry for extended periods (sometimes years) without degradation of functionality of the valves.

If air or another inert gas is used as the pressurizing medium for the testing, every single valved conduit can be rapidly tested during the manufacturing process. That is, the leak test is non-destructive, and with the use of the illustrated system, can be accomplished in a relatively short time. A "dry" bioprosthetic valve coupled to a sealed conduit can be tested for leaks and, if it passes, can be immediately dry packaged for shipping and delivery. Or, preferably, the exterior components of the valve can be tested within the conduit, and then the remaining valve components assembled prior to sealing into sterile packaging. Consequently, embodiments of the disclosed system provide 100% quality control.

While the systems, devices, and methods have been described with reference to particular embodiments, it will be understood that various changes and additional variations may be made and equivalents may be substituted for elements thereof without departing from the scope of the disclosure. In addition, many modifications may be made to adapt a particular situation or device to the teachings herein without departing from the essential scope thereof. Therefore, it is intended that the disclosure is not be limited to the particular embodiments disclosed herein, but includes all embodiments falling within the scope of the appended claims.

What is claimed is:

1. A method of leak testing a surgical conduit, the method comprising:
   positioning a gas-permeable surgical conduit within a test fixture including a manifold assembly, the surgical conduit including a tubular matrix impregnated with gelatin or collagen, the manifold assembly having first and second manifolds each with structure for clamping and sealing onto respective first and second ends of the surgical conduit, wherein one of the manifolds has gas flow passages between an external fitting and an internal port that opens to a lumen of the surgical conduit when clamped thereon;
   introducing inert gas to the external fitting to pressurize the lumen of the surgical conduit until a target pressure of the inert gas within the conduit is reached for a first time period;
   maintaining the target pressure within the conduit for a second time period following the first time period while measuring a change in flow rate of the inert gas through the conduit corresponding to a leak rate through a wall of the conduit; and
   assigning a passing or failing result to the surgical conduit depending on the measured change in flow rate
   wherein the first end and the second end of the surgical conduit are movable relative to each other, wherein at least one of the first and second manifolds is moveable towards and away from the other of the first and second manifolds, and the method includes permitting the at least one of the first and second manifolds to move away from the other of the first and second manifolds after they have been sealingly clamped to the surgical conduit and while pressurizing the conduit to the target pressure.

2. The method of claim 1, wherein the inert gas is selected from the group consisting of oxygen, nitrogen, helium, argon, carbon dioxide, hydrogen, hydrocarbons, hydrofluorocarbons, fluorocarbons, fluorochlorocarbons, and combinations thereof.

3. The method of claim 1, wherein the step of introducing inert gas to pressurize the lumen of the surgical conduit is done at a non-linear rate which slows down as the pressure in the conduit gets closer to the target pressure.

4. The method of claim 3, wherein the non-linear rate includes three fill stages, with a slower initial fill rate, a faster main fill rate, and a slower final fill rate.

5. The method of claim 1, wherein measuring a change in flow rate is done using a mass flow meter.

6. The method of claim 1, wherein
   each of the first and second manifolds comprises a piston disposed in a chamber therein, and each piston is reversibly displaceable within the chamber between a first position and a second position, wherein in the first position, the respective end of the surgical conduit is not clamped and sealed to the respective manifold and in the second position, the respective end of the surgical conduit is clamped and sealed to the respective manifold.

7. The method of claim 6, wherein
   at least one of the first and second manifolds includes a mandrel, a portion of which is dimensioned to receive the respective end of the surgical conduit and an elastomeric clamping ring disposed around the portion of the mandrel, and wherein the elastomeric ring is compressed by piston displacement and positioned to expand radially inward and clamp and seal the surgical conduit against the portion of the mandrel that receives the respective end of the surgical conduit.

8. The method of claim 1, wherein the surgical conduit comprises a tubular graft portion and is configured to form a part of a valved conduit with a one-way valve attached to a second end of the graft portion, wherein the surgical conduit is subjected to leak testing prior to attachment of internal portions of the one-way valve, yet prior to leak testing the surgical conduit has a resilient sealing ring attached thereto extending radially outward from the second end of the graft portion, the resilient sealing ring forming a part of the one-way valve and having an undulating shape around a periphery thereof, and wherein the structure for clamping and sealing on one of the first and second manifolds includes a pair of rigid clamps sized and shaped to conform to and axially compress the resilient sealing ring.

9. The method of claim 1, wherein the surgical conduit comprises a valved conduit with a one-way valve attached to a second end of a tubular graft portion, the one-way valve having a resilient sealing ring attached thereto extending radially outward from the second end of the graft portion, the resilient sealing ring having an undulating shape around a periphery thereof, and wherein the structure for clamping and sealing on one of the first and second manifolds includes a pair of rigid clamps sized and shaped to conform to and axially compress the resilient sealing ring, and further wherein the inert gas is air.

10. A method of leak testing a surgical conduit, the method comprising:
    positioning a gas-permeable surgical conduit within a test fixture including a manifold assembly, the surgical conduit including a tubular matrix impregnated with gelatin or collagen, the manifold assembly having first and second manifolds each with structure for clamping and sealing onto respective first and second ends of the surgical conduit, wherein one of the manifolds has gas flow passages between an external fitting and an internal port that opens to a lumen of the surgical conduit when clamped thereon;

introducing inert gas to the external fitting to pressurize the lumen of the surgical conduit until a target pressure of inert gas within the conduit is reached;

measuring a pressure decay within the conduit for a predetermined period of time as the inert gas leaks through a wall of the surgical conduit; and assigning a passing or failing result to the surgical conduit depending on the measured pressure decay wherein the first end and the second end of the surgical conduit are movable relative to each other, wherein at least one of the first and second manifolds is moveable towards and away from the other of the first and second manifolds, and the method includes permitting the at least one of the first and second manifolds to move away from the other of the first and second manifolds after they have been sealingly clamped to the surgical conduit and while pressurizing the conduit to the target pressure.

11. The method of claim 10, wherein the inert gas is selected from the group consisting of oxygen, nitrogen, helium, argon, carbon dioxide, hydrogen, hydrocarbons, hydrofluorocarbons, fluorocarbons, fluorochlorocarbons, and combinations thereof.

12. The method of claim 10, wherein the predetermined period of time is between about 0.1-0.8 seconds.

13. The method of claim 10, wherein the step of introducing inert gas to pressurize the lumen of the surgical conduit is done at a non-linear rate which slows down as the pressure in the conduit gets closer to the target pressure.

14. The method of claim 13, wherein the non-linear rate includes three fill stages, with a slower initial fill rate, a faster main fill rate, and a slower final fill rate.

15. The method of claim 10, wherein each of the first and second manifolds comprises a piston disposed in a chamber therein, and each piston is reversibly displaceable within the chamber between a first position and a second position, wherein in the first position, the respective end of the surgical conduit is not clamped and sealed to the respective manifold and in the second position, the respective end of the surgical conduit is clamped and sealed to the respective manifold.

16. The method of claim 15, wherein at least one of the first and second manifolds includes a mandrel, a portion of which is dimensioned to receive the respective end of the surgical conduit and an elastomeric clamping ring disposed around the portion of the mandrel, and wherein the elastomeric ring is compressed by piston displacement and positioned to expand radially inward and clamp and seal the surgical conduit against the portion of the mandrel that receives the respective end of the surgical conduit.

17. The method of claim 10, wherein the surgical conduit comprises a tubular graft portion and is configured to form a part of a valved conduit with a one-way valve attached to a second end of the graft portion, wherein the surgical conduit is subjected to leak testing prior to attachment of internal portions of the one-way valve, yet prior to leak testing the surgical conduit has a resilient sealing ring attached thereto extending radially outward from the second end of the graft portion, the resilient sealing ring forming a part of the one-way valve and having an undulating shape around a periphery thereof, and wherein the structure for clamping and sealing on one of the first and second manifolds includes a pair of rigid clamps sized and shaped to conform to and axially compress the resilient sealing ring.

18. The method of claim 10, wherein the surgical conduit comprises a valved conduit with a one-way valve attached to a second end of a tubular graft portion, the one-way valve having a resilient sealing ring attached thereto extending radially outward from the second end of the graft portion, the resilient sealing ring having an undulating shape around a periphery thereof, and wherein the structure for clamping and sealing on one of the first and second manifolds includes a pair of rigid clamps sized and shaped to conform to and axially compress the resilient sealing ring, and further wherein the inert gas is air.

* * * * *